(12) United States Patent
Sun et al.

(10) Patent No.: US 9,476,648 B2
(45) Date of Patent: Oct. 25, 2016

(54) SYSTEMS AND METHODS OF USING PHASE CHANGE MATERIAL IN POWER PLANTS

(71) Applicants: Ying Sun, Merion Station, PA (US); Matthew McCarthy, Media, PA (US); Young I. Cho, Cherry Hill, NJ (US); Philipp Boettcher, Philadelphia, PA (US); Han Hu, Philadelphia, PA (US); Baolan Shi, Palo Alto, CA (US); Qinghua Xie, Reading, PA (US)

(72) Inventors: Ying Sun, Merion Station, PA (US); Matthew McCarthy, Media, PA (US); Young I. Cho, Cherry Hill, NJ (US); Philipp Boettcher, Philadelphia, PA (US); Han Hu, Philadelphia, PA (US); Baolan Shi, Palo Alto, CA (US); Qinghua Xie, Reading, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 14/601,616

(22) Filed: Jan. 21, 2015

(65) Prior Publication Data
US 2015/0204612 A1 Jul. 23, 2015

Related U.S. Application Data

(60) Provisional application No. 61/929,747, filed on Jan. 21, 2014.

(51) Int. Cl.
*F28D 15/00* (2006.01)
*F28D 1/02* (2006.01)
(Continued)

(52) U.S. Cl.
CPC ........... *F28D 1/0233* (2013.01); *B01F 3/0473* (2013.01); *F28D 20/023* (2013.01); *F28C 3/10* (2013.01); *F28D 11/00* (2013.01)

(58) Field of Classification Search
CPC .............. F28C 1/14; F28C 3/10; F28C 3/18; F28C 2001/006; F28F 25/06; F01K 9/003; F01K 9/00; F01K 9/02; F28D 1/0233; F28D 11/00; F28D 11/02; F28D 20/021; F28D 20/023; F28D 20/025; F24F 3/1423; B01J 8/386; B01F 3/0473
USPC .................. 165/104.17, 900, 6, 7, 8, 104.18
See application file for complete search history.

(56) References Cited

U.S. PATENT DOCUMENTS 3,788,385 A * 1/1974 Delahunty ............... C09K 5/06
165/104.13
4,443,389 A 4/1984 Dodds
(Continued)

FOREIGN PATENT DOCUMENTS

EP 0220607 B1 8/1989
EP 0402131 B1 10/1993
(Continued)

OTHER PUBLICATIONS

Mehling, H., et al., "Solid-Liquid Phase Change Materials," Heat and Cold Storage with PCM Heat and Mass Transfer, 2008, pp. 11-55.
(Continued)

*Primary Examiner* — Marc Norman
*Assistant Examiner* — Jon T Schermerhorn
(74) *Attorney, Agent, or Firm* — Mendelsohn Dunleavy, P.C.

(57) ABSTRACT

Cooling systems and methods for cooling in a power plant using a phase change material. In one embodiment, a phase change material container includes at least one phase change material which may be in the form of a slurry; and at least one conduit for transporting the fluid through the phase change material when located in the phase change material container. The system may also comprise an air flow chamber; and a phase change material flow system including a pump for pumping phase change material from an outlet of phase change material container, to at least one phase change material spray nozzle. The phase change material flow system is configured to ensure that solidified phase change material is returned to the phase change material container.

4 Claims, 23 Drawing Sheets

(51) Int. Cl.
*F28D 20/02* (2006.01)
*B01F 3/04* (2006.01)
*F28D 11/00* (2006.01)
*F28C 3/10* (2006.01)

(56) References Cited

U.S. PATENT DOCUMENTS

| | | | |
|---|---|---|---|
| 7,823,381 | B2 | 11/2010 | Misselhorn |
| 7,900,690 | B2 * | 3/2011 | Hawwa ................ H01L 23/373 165/185 |
| 8,895,124 | B2 * | 11/2014 | Van Eibergen ........ C09K 5/063 138/137 |
| 2005/0269063 | A1 * | 12/2005 | Zuo ...................... F28D 15/046 165/104.14 |
| 2008/0010999 | A1 | 1/2008 | Sonnenrein |
| 2010/0018237 | A1 | 1/2010 | Wallace |
| 2010/0154406 | A1 | 6/2010 | Conrad et al. |
| 2010/0186438 | A1 | 7/2010 | Jarvis |
| 2011/0162829 | A1 * | 7/2011 | Xiang ........................... 165/234 |
| 2012/0018116 | A1 * | 1/2012 | Mathur ................. C09K 5/063 165/10 |
| 2012/0111005 | A1 | 5/2012 | Fichtner et al. |
| 2013/0000867 | A1 | 1/2013 | Szabo et al. |
| 2013/0228308 | A1 * | 9/2013 | Abhari ..................... 165/104.17 |
| 2014/0023853 | A1 * | 1/2014 | Gueret et al. ................. 428/323 |

FOREIGN PATENT DOCUMENTS

| | | |
|---|---|---|
| EP | 1031808 A2 | 8/2000 |
| EP | 1015832 B1 | 9/2001 |
| EP | 1478891 B1 | 10/2008 |
| EP | 1841964 B1 | 9/2010 |
| EP | 2498037 A2 | 9/2012 |
| JP | 2001201284 A | 7/2001 |
| JP | 2008309344 A | 12/2008 |
| KR | 101102333 B1 | 1/2012 |

OTHER PUBLICATIONS

Choi, Y. "Phase-Change Materials: Trends & Prospects," Department of Materials Science and Engineering, Korea Aerospace University, Jan. 10, 2013, pp. 1-58.
Shi, J., et al., "Potential Game Changing Cooling Technology Development for Power Plant Water Conservation," EPRI Electric Power Research Institute, Texas Industries of the Future Technology Forum, Houston, TX, Jun. 19, 2013.
Sutterlin, W. R., "Phase Change Materials, A Brief Comparison of Ice Packs, Salts, Paraffins, and Vegetable-derived Phase Change Materials," Pharmaceutical Outsourcing, Journal of Pharmaceutical and Biopharmaceutical Contract Services, 1-4 pages.
"Phase-change material" As retrieved on Nov. 22, 2013 from "http://en.wikipedia.org/w/index.php?title=Phase-change_material &oldid=562227688".
International Search Report and Written Opinion; Mailed Apr. 30, 2015 for the corresponding PCT Application No. PCT/US2015/012191.

* cited by examiner

FIG. 7

SYSTEMS AND METHODS OF USING PHASE CHANGE MATERIAL IN POWER PLANTS

RELATED APPLICATION DATA

This application claims the benefit of U.S. Provisional Application No. 61/929,747, filed on Jan. 21, 2014, the contents of which are herein incorporated by reference.

STATEMENT OF GOVERNMENT INTEREST

This invention was made with government support under Grant No. 1357918 by the National Science Foundation. The government has certain rights in the invention.

BACKGROUND OF THE INVENTION

1. Field of the Invention

The present invention is directed to the field of power plants. In particular, the present invention is directed to systems and methods for cooling a power plant using phase change materials.

The cooling towers for power plants generally consume a large amount of water. For example, in the year 2000, coal and gas power plants in the eight-state Interior West region of the United States withdrew over 650 million gallons of water per day, totaling over 728,000 acre-feet each year. That is enough water for the annual needs of at least 3.64 million people. Water in the West of the United States is becoming increasingly valuable especially in light of widespread drought conditions.

2. Description of Related Technology

Although agriculture is the largest water user in most of the United States, power production can have a large impact on the water supply and water quality in specific locations, especially in river basins that are already over-extended with other water uses. Large amounts of research have been devoted to design a cooling tower with a higher cooling efficiency and to reduce water consumption. For example, U.S. Patent Application Publication No. 2010/0018237 discloses a low water consumption cooling tower for gasification plants. The cooling tower comprises a wet section having a plurality of wet section fans and a dry section having a plurality of dry section fans. The wet section fans are adjustable to operate at different rates, depending upon ambient conditions surrounding the cooling tower. The wet section may comprise at least one shutter door. In operation, the wet section fans typically operate at an increased rate during a summer peak price period and at a reduced rate during a winter peak price period and an off-peak price period. The dry section fans operate at the increased rate all year. This method allows for less evaporative cooling and more latent cooling thereby reducing water consumption.

U.S. Patent Application Publication No. 2010/0154406 discloses a cooling tower system that exhibits increased energy efficiency. The cooling tower system includes a cooling tower unit, an expansion engine and a power operated component such as a fan or pump. The process fluid is first used to heat a working fluid for an expansion engine before being sent to the cooling tower for cooling. Power generated by the expansion engine is utilized to operate a component of the cooling tower such as a fan or a pump. The cooling tower is also utilized to provide cooling to condense the working fluid from vapor to liquid. The cooling tower removes waste heat from the process fluid.

U.S. Patent Application Publication No. 2013/0000867 discloses a hybrid cooling system for condensing an exhaust stream of a steam turbine. The cooling system comprises a dry cooling circuit, a dry air-cooled unit performing heat dissipation to cooling water flowing therein, and a wet cooling circuit and a wet cooled unit performing heat dissipation to the cooling water flowing therein. The cooling water flowing in the dry cooling circuit is separated from the cooling water flowing in the wet cooling circuit, and the dry and wet cooling circuits are connected to a common condenser. The hybrid cooling system reduces the evaporation and deposition losses of the wet cooling system, thereby reducing water consumption.

EP 2 498 037 A2 discloses a hybrid fan cooling tower apparatus that extends along a vertical axis. The cooling tower includes a first housing structure having an inlet and a first outlet located at a first position along the vertical axis, wherein the housing structure includes a base and opposing side walls that extend along the vertical axis away from the base. The tower also includes a heat exchanger disposed in the housing structure. The heat exchanger is positioned adjacent the first outlet and extends at least partially across the first outlet. The hybrid tower employs an air current generator positioned in a plane normal to the vertical axis and oriented to direct an air stream toward the base and through the heat exchanger and the first outlet.

Even with these improved cooling tower designs from the prior art, water consumption is still a major disadvantage for power plants throughout the world. The reliance on water places constraints on the location of power plants, which is currently limited to areas near a large body of water. Unfortunately, these areas are also densely populated, creating safety and pollution concerns. A cooling tower that reduces or eliminates water consumption will enable building of power plants in remote areas with little water available which are poorly suited for human living and agriculture.

SUMMARY OF THE INVENTION

An aspect of the invention may be a cooling system for cooling a fluid, comprising: a phase change material container housing at least one phase change material; at least one conduit for transporting said fluid passing through said phase change material; an air flow chamber; a device for generating an air flow through the air flow chamber; an air flow outlet fluidly connected to said air flow chamber for removing heated air from said cooling system; and a phase change material flow system for circulating phase change material from said phase change material container via said air flow chamber and back to said phase change material container.

Another aspect of the invention may be a method for operating a cooling system for cooling a fluid, comprising steps of: transferring heat from the fluid to a phase change material to melt at least some of the phase change material to provide liquid phase change material; spraying droplets containing said liquid phase change material into circulating air for cooling and solidifying at least some of the liquid phase change material to provide solid phase change material by heating said air to provide heated air; recycling the solid phase change material to the transferring step; and removing the heated air from the cooling system Still yet another aspect of the invention may be a cooling system for cooling a fluid, comprising a heat exchanger including an encapsulated phase change material, wherein heat is transferred from the fluid to an encapsulated phase change material to melt at least some of the phase change material therein.

BRIEF DESCRIPTION OF THE DRAWINGS

FIG. 7 shows the relationship between spray-freezing distance vs. phase change material droplet diameter in a computer simulated model.

DETAILED DESCRIPTION OF THE PREFERRED EMBODIMENT(S)

Figure 1:
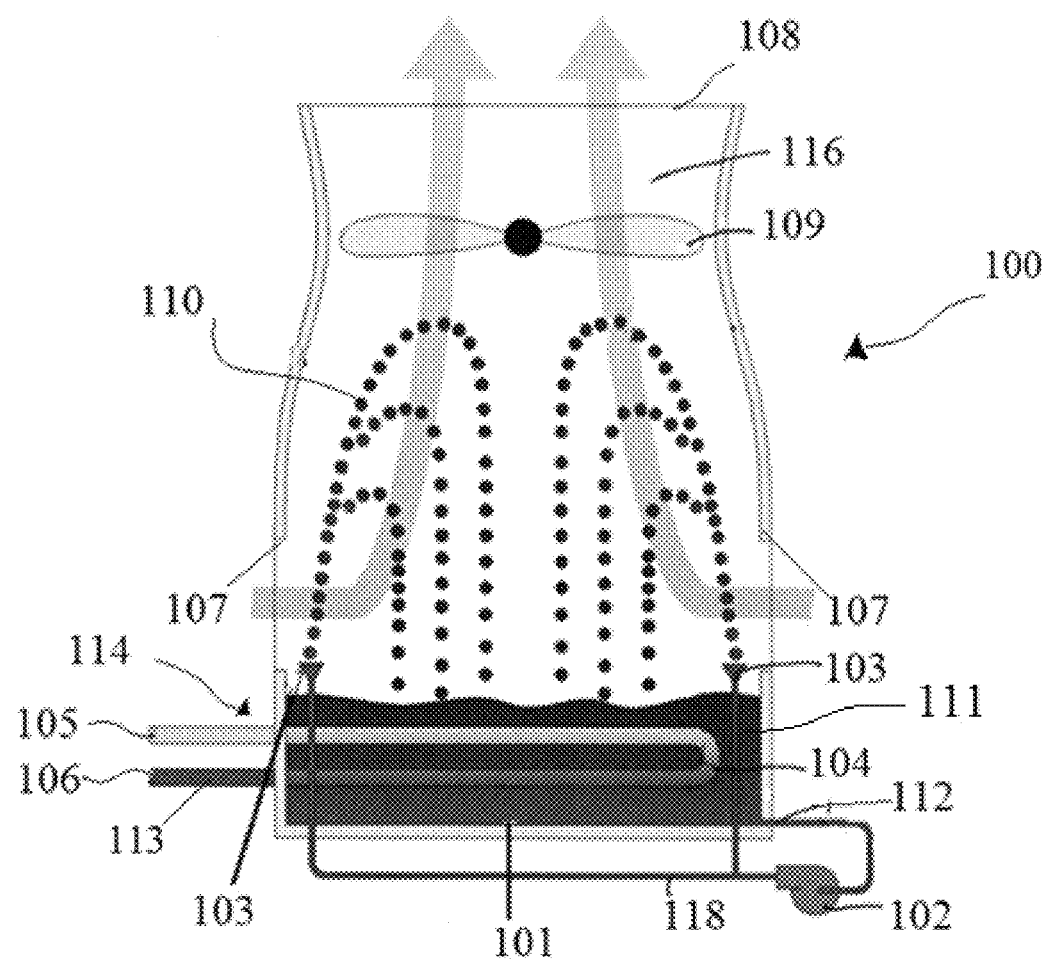
FIG. 1 is a schematic representation of a cooling system according to one embodiment of the present invention.

For illustrative purposes, the principles of the present disclosure are described by referencing various exemplary embodiments. Although certain embodiments are specifically described herein, one of ordinary skill in the art will readily recognize that the same principles are equally applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s)

disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

As used herein, the term "phase change material" or "PCM" refers to a material that has the capability of absorbing or releasing heat by undergoing a phase change or transition within a temperature stabilizing range. A temperature stabilizing range can include a specific phase change or transition temperature or a range of phase change or transition temperatures. Heat can be stored by, or removed from, a phase change material as a result of the material undergoing a phase change. Phase change materials described herein have an enthalpy of phase change of at least about 50 J/g.

As used herein, the term "encapsulated phase change material" or "EPCM" refers to a phase change material that is partially or completely enclosed by another material. For example, a phase change material encapsulated by a tube or a sphere.

Spray-Freezing of Phase-Change Materials

As shown in FIG. 1, the present invention provides a cooling system 100 for cooling a fluid 113. The cooling system 100 has a PCM flow system 114, which includes a PCM container 101 housing at least one PCM 111. The PCM container 101 has at least one conduit 104 located therein for transporting fluid 113 through the PCM 111 located within the PCM container 101. The fluid 113 may be any fluid typically used for cooling, such as water.

An air flow chamber 116 is located above the PCM container 101 within the cooling system 100. The air flow chamber 116 is provided with an air flow device 109 for generating air flow through the air flow chamber 116 and an outlet 108 for removing heated air from the cooling system 100. The air flow device 109 in the embodiment shown in FIG. 1 is large fan-type object with rotating blades. However, other mechanisms may be used as the air flow device 109 in order to create the air flow. 4

The PCM system 114 comprises an outlet 112 located at a lower portion of the PCM container 101, at least one PCM spray nozzle 103 for spraying liquid-containing PCM droplets 110 into the air flow chamber 116, and a pump 102 in fluid communication with the PCM spray nozzle 103 and outlet 112 of the PCM container 101. The pump 102 moves the liquid-containing PCM from the outlet 112 to the PCM spray nozzle 103 and the PCM spray nozzle 103 sprays the liquid-containing PCM 111 into the air flow chamber 116. The PCM outlet 112 may be located at a lower portion of the phase change material container 101, where the phase change material 111 contains liquid phase change material 115. In an exemplary embodiment, the PCM outlet 112 is at or near the bottom of the phase change material container 101. However, the liquid PCM 115 may also be pumped to an elevated position in the air flow chamber 116 below the air flow device 109 and sprayed downwardly into the PCM container 101.

For certain implementations, the PCM 111, may be a PCM that can be a mixture of two or more materials. By selecting two or more different materials and forming a mixture, a temperature stabilizing range can be adjusted for any desired application. The resulting mixture can exhibit two or more different phase transition temperatures or a single modified phase transition temperature when encapsulated in the coated articles described herein.

Phase change materials may be broadly divided into organic phase change materials and inorganic phase change materials. Organic phase change materials, include paraffinic hydrocarbons ($C_nH_{2n+2}$) and fatty acids ($CH_3(CH_2)_{2n}COOH$). Other organic phase change materials include fatty alcohols, glycols, ethers, amides, fatty acid esters, linear hydrocarbons, branched hydrocarbons, cyclic hydrocarbons, halogenated hydrocarbons and combinations thereof. Alkanes (often referred to as paraffins), esters and alcohols are particularly preferred. Alkanes are preferably substantially n-alkanes that are most often commercially available as mixtures of substances of different chain lengths, with the major component, which can be determined by gas chromatography, having 10-50, or usually between 12 and 32 carbon atoms. Examples of suitable major components of alkane organic phase change materials include n-octacosane, n-docosane, n-eicosane, n-octadecane, n-heptadecane, n-hexadecane, n-pentadecane and n-tetradecane.

Suitable esters for use as organic phase change materials may comprise one or more $C_1$-$C_{10}$ alkyl esters of $C_{10}$-$C_{24}$ fatty acids, particularly methyl esters where the major component is methyl behenate, methyl arachidate, methyl stearate, methyl palmitate, methyl myristate or methyl laurate. Suitable alcohols for use as organic phase change materials include one or more alcohols where the major component is, for example, n-decanol, n-dodecanol, n-tetradecanol, n-hexadecanol, and n-octadecanol.

Inorganic phase change materials include salt hydrates ($M_nH_2O$), as well as inorganic salts such as aluminum phosphate, ammonium carbonate, ammonium chloride, cesium carbonate, cesium sulfate, calcium citrate, calcium carbonate, calcium chloride, calcium hydroxide, calcium oxide, calcium phosphate, calcium saccharate, calcium sulfate, cerium phosphate, chromic chloride, iron phosphate, lithium carbonate, lithium sulfate, magnesium chloride, magnesium sulfate, manganese chloride, manganese nitrate, manganese sulfate, potassium acetate, potassium carbonate, potassium chloride, potassium hydroxide, potassium phosphate, rubidium carbonate, rubidium sulfate, disodium tetraborate, sodium acetate, sodium bicarbonate, sodium bisulfate, sodium borate, sodium carbonate, sodium citrate, sodium chloride, sodium hydroxide, sodium nitrate, sodium percarbonate, sodium persulfate, sodium phosphate, sodium propionate, sodium selenite, sodium silicate, sodium sulfate, sodium tellurate, sodium tetraborate, sodium thiosulfate, strontium hydrophosphate, zinc acetate, zinc chloride, eutectic of $Li_2CO_3$ and $Na_2CO_3$, and combinations thereof.

Phase change materials can undergo a solid-liquid/liquid-solid phase transition at phase changing temperatures. A person skilled in the art may select the proper phase change material depending on the temperature of the fluid 113 entering and exiting the PCM container 101. At the temperature of the fluid 113 entering the PCM container 101, the phase change material should be essentially a liquid. In addition, at the temperature of the fluid 113 exiting the phase change material container 101, the phase change material should also be liquid.

Figure 2:
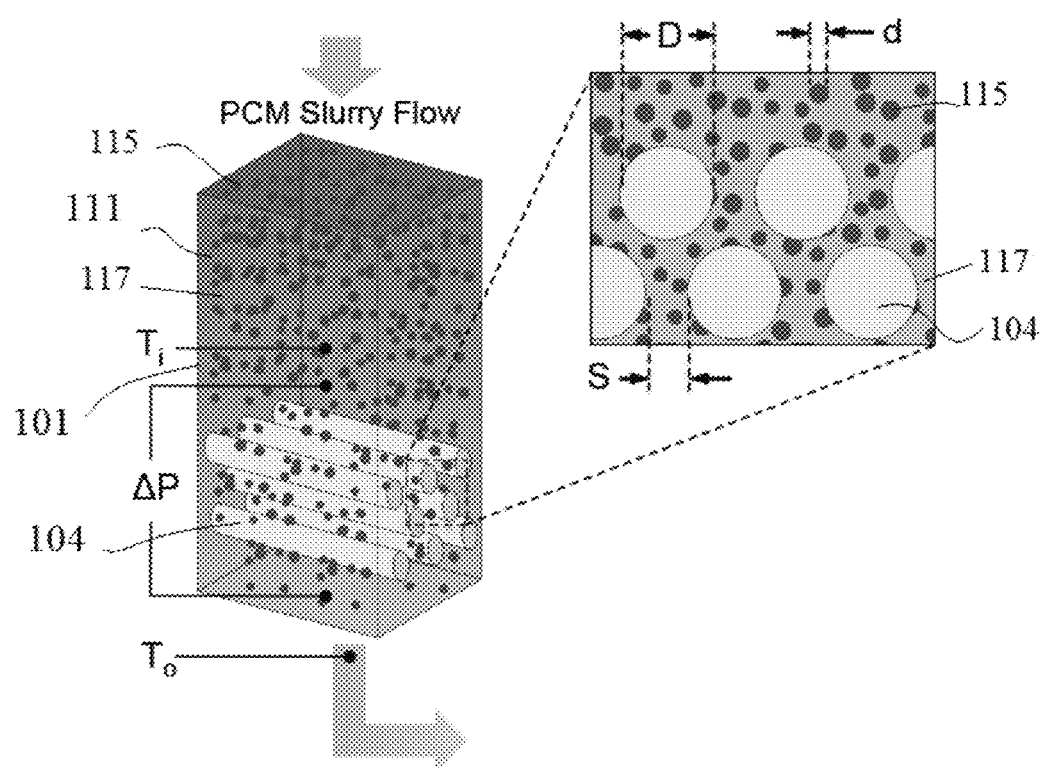
FIG. 2 is a schematic representation of phase change material slurry flow and heat transfer characteristics in the phase change material.

Referring to FIG. 2, in some embodiments, the PCM 111 in the PCM container 101 may be a slurry of solid particles 117 and liquid PCM 115. The provision of a slurry of phase change material 111 in the PCM container 101 offers some advantages by promoting heat transfer through the phase change material 111 and by stabilizing the temperature of the slurry. The lower portion of the phase change material 111 in the PCM container 101 will contain liquid PCM 115.

Referring back to FIG. 1, in some embodiments, the phase change temperature of the PCM 111 is from about 0° C. to about 100° C. below the temperature of the fluid 113 entering into the inlet 105 and passing through the PCM container 101 via the conduit 104. In some embodiments, the phase change temperature of the PCM 111 is from about 5° C. to about 80° C. below the temperature of the fluid 113 passing into the inlet 105 and passing through the phase change material container 101 via conduit 104. In some embodiments, the phase change temperature of the PCM 111 is from about 10° C. to about 60° C. below the temperature of the fluid 113 passing into the inlet 105 and through the phase change material container 101 via conduit 104.

In some embodiments, the fluid 113 is steam which is passed through the conduit 104 to be condensed. The steam enters the conduit 104 through the fluid inlet 105 and exits as a liquid (such as water) through the fluid outlet 106. In an exemplary embodiment, the steam condensation temperature is in the range of from about 20° C. to about 70° C., or from about 25° C. to about 60° C., or from about 30° C. to about 55° C., or from about 30° C. to about 50° C., or from about 35° C. to about 45° C. It has been found that at a fluid condensation temperature of about 40° C. using a phase change material, net power production can be increased, with a gain of up to 10%, in comparison with air cooled condensers.

In an another exemplary embodiment, the phase change temperature of the PCM 111 is in the range of from about 10° C. to about 60° C., or from about 15° C. to about 50° C., or from about 20° C. to about 45° C., or from about 20° C. to about 40° C., or from about 25° C. to about 35° C.

Generally, the enthalpy of phase change for the phase change of the PCM 111 is high. Suitable organic phase change materials 111 exhibit a high enthalpy of phase change, typically greater than 50 J/g, usually at least 90 J/g, preferably at least 100 J/g, more preferably greater than 120 J/g, even more preferably greater than 150 J/g and most preferably greater than 200 J/g when determined by Differential Scanning calorimetry (DSC) as measured using a Perkin Elmer DSC1 at a scan speed of 5° C./minute. This high enthalpy of phase change allows a relatively large amount of heat transfer from the fluid to the PCM 111 and from the PCM droplets 110 to the air, based on the weight of the PCM 111, and allows use of less material to transfer the heat rendering the cooling system 100 more energy efficient.

In some embodiments, one or more types of thermal conductivity enhancers, including metal meshes, graphite foams, and nano-sized additives may be added to the PCM 111 to facilitate heat transfer to or from the PCM 111. Metal meshes have mesh holes for enhancing thermal conductivity. The meshes have a structure in which fibers of the mesh are interwoven, such as a film or sheet provided with through holes. More details about metal meshes can be found in, for example, EP 2 612 755 A1, the disclosure of which is incorporated herein by reference in its entirety.

Graphite foams offer an integrated network for heat flow. In one embodiment, graphite foams are embedded between the conduits 104 to enhance thermal conductivity in the PCM container 101. Such graphite foams may add drag to phase change material slurries, which may be compensated by increasing the pumping power of the pump 102. The graphite foams are described in, for example, WO 2012/011934 A1, which is incorporated herein by reference.

In another embodiment, high thermal conductivity nano-sized additives may be added to the PCM 111. Some examples of nano-sized additives include carbon nanotubes, carbon/graphite nanofibers, and exfoliated graphene nano-platelets (xGnP). In an exemplary embodiment, xGnP at 10 wt % loading in a phase change material, such as paraffin, can provide up to a 10-fold increase thermal conductivity. However, the viscosity of the paraffin/xGnP composite increases as the loading, f, of the xGnP, increases, thereby placing an effective upper limit on the amount of xGnP that can be incorporated into the phase change material 111.

Suitable nano-sized additives include carbon black, other carbon-based materials, silicon carbide, carbon nanotubes (commercially available from Carbon Nanotechnologies, Inc.) and nano fibers (commercially available from Applied Sciences, Inc. of Ohio). In some embodiments, the nano-sized additives have a loading of from about 2 wt. % to about 15 wt. % of the total weight of the phase change material/nano-sized additive composition, or from about 3 wt. % to about 12 wt. %, or from about 3 wt. % to about 10 wt. % or from about 4 wt. % to about 8 wt. % or from about 5 wt. % to about 7 wt. % of the total weight of the phase change material/nano-sized additive composition.

Referring to FIGS. 1 and 2, the PCM container 101 houses PCM 111. The top surface of the PCM 111 held in the PCM container 101 receives solid phase change material 117 from the air flow chamber 116. During operation, the lower portion of the PCM 111 held in the PCM container 101 contains liquid PCM 115. In some embodiments, the combination of the solid PCM 117 and the liquid PCM 115 forms a slurry of phase change material 111 in the PCM container 101. As shown in FIGS. 1 and 2, at least one conduit 104 runs through the PCM container 101, and as shown in FIG. 2 it is contemplated that a plurality of conduits 104 run through the PCM container 101. The fluid 113 to be cooled enters the conduit 104 through a fluid inlet 105 and the cooled fluid 113 exits from the conduit 104 through fluid outlet 106. As the fluid 113 passes through the conduit 104 in the PCM container 101, heat is transferred from the fluid 113 through the wall(s) of the conduit 104 to the PCM 111. As a result of the transfer of this heat, solid phase change material 117 is melted whereby a large amount of heat is absorbed as a result of the high enthalpy of phase transition of the PCM.

Figure 3:
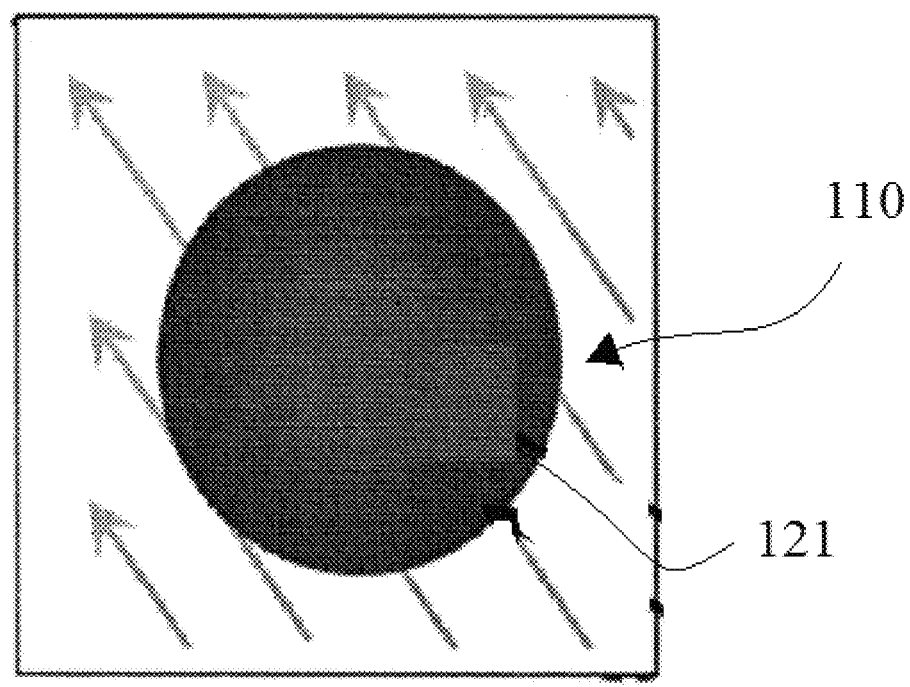
FIG. 3 shows a phase change material droplet in an air flow within an air flow chamber of the cooling system of the present invention.

Referring to FIGS. 2 and 3, in some embodiments, a plurality of conduits 104 pass through PCM container 101 to provide a greater surface area for heat transfer from the fluid to the PCM 111 held within the PCM container 101. The conduits 104 pass through the PCM 111 in the PCM container 101. Solid PCM 117 may be provided to the top surface of the PCM 111 in the PCM container 101, though it is also possible to deliver the solid PCM 117 to other locations within the phase change material 111 in PCM container 101. Thus, in operation, the phase change material 111 in the PCM container 101 typically contains a mixture of solid PCM 117 and liquid PCM 115 which may form a slurry. As a result of the heat transfer from the fluid 113 to the PCM 111, the solid PCM 117 in the PCM container 101 undergoes a phase change to become liquid PCM 115.

Referring to FIG. 2, at the lower portion of the PCM container 101, the PCM 111 includes liquid PCM 115. Liquid-containing phase change material 111 at the lower portion of the PCM container 101 exits through an outlet 112 to enter the phase change material flow system 114. Thus, the PCM 111 in the PCM container 101 undergoes a constant vertical flow from the top of the PCM container 101 to the bottom of the PCM container 101 and then is returned to the PCM container 101 by the phase change material flow system 114. In the process of moving through the PCM container 101, the PCM 111 absorbs heat from the fluid in the at least one conduit 104 and solid PCM 117 undergoes the solid-liquid phase change to form liquid phase change material 115.

In some embodiments, the solid PCM 117 may become molten at from about 30% to about 70% of the distance from the top surface of the PCM 111 to the bottom of the PCM container 101, or from about 40% to about 60%, or from about 45% to about 55% of the distance from the top surface of the PCM 111 to the bottom of the PCM container 101.

In some embodiments, each conduit 104 has a diameter of from about 0.025 m to about 0.1 m, or from about 0.035 m to about 0.09 m, or about 0.045 m to about 0.08 m, or from about 0.055 m to about 0.07 m. The distance between the conduits 104 may be from about 0.01 m to about 0.03 m, or from about 0.015 m to about 0.025 m.

Referring to FIG. 2, the flow and thermal behavior of slurries comprising solid PCM 117 of a defined size suspended in liquid PCM 115 is explained. FIG. 2 shows a schematic representation of one embodiment of vertical flow from the top to the bottom of the PCM container 101 that passes a phase change material slurry over the assembly of conduits 104. The overall net flow of PCM 111 towards the bottom of the PCM container 101 may be at a volume flux in a range of from about 1 mm/s to about 20 mm/s, or from about 2 mm/s to about 15 mm/s, or from about 2 mm/s to about 12 mm/s, or from about 3 mm/s to about 10 mm/s. The denser solid PCM 117 may settle through the liquid PCM 115 due to buoyancy effects as the slurry flows towards the bottom of the PCM container 101.

In some embodiments, the thermofluidic phenomena in the PCM container 101 may be characterized by dimensionless parameters as listed in Table 1 that may be used to correlate fluid flow and heat transfer. Table 1 shows value ranges for the dimensionless control variables. In Table 1, U is the free stream volume flux entering the cylinder array, $V_{Solid}$ and $V_{Total}$ are the volumes of the solid particles and the total slurry, and $\alpha$ is the thermal diffusivity of the liquid phase PCM.

TABLE 1

| Dimensionless Control Variables | | |
| --- | --- | --- |
| Parameter | Equation | Range |
| Reynolds number | Re = UD/ν | 1-1200 |
| Prandtl number | Pr = ν/α | 1-100 |

TABLE 1-continued

| Dimensionless Control Variables | | |
| --- | --- | --- |
| Parameter | Equation | Range |
| PCM volume fraction | $\phi = V_{Solid}/V_{Total}$ | 0.01-0.6 |
| Diameter ratio | $\delta = d/D$ | 0.01-0.4 |
| Spacing ratio | $\sigma = S/D$ | 0.1-2 |

These dimensionless control parameters are correlated to pressure coefficient ($C_P$) and Nusselt number (Nu) as:

$$C_P = 2\Delta P/\rho_{pcm}U^2 = f_1(Re,Pr,\phi,\delta,\sigma)$$

$$Nu = h_{pcm}D/k_{pcm} = f_2(Re,Pr,\phi,\delta,\sigma)$$

$$h_{pcm} = Q/[A(T_{wall}-T_i)]$$

where $\rho_{pcm}$ and $k_{pcm}$ are the density and thermal conductivity of the liquid phase change material 111, and $h_{pcm}$ is the heat transfer coefficient of the phase change material slurry, Q is the total heat supplied by the fluid 113 entering the conduit 104, A is the total surface area of the conduits 104, and $T_{wall}$ and $T_i$ are the average conduit surface temperature and the phase change material temperature before absorbing heat from the conduit 4, respectively. $T_o$ is the temperature of the PCM 111 exiting the PCM container 101, i.e. after heat absorption from the conduit 104.

Referring back to FIG. 1, the air flow chamber 116 is where the heat transfers from the liquid-containing phase change material droplets 110 to an air flow through the air flow chamber 116. The air flow chamber 116 has plurality of air inlets 107 for the cool air to enter the air flow chamber 116 and an air outlet 108 for the heated air to exit the air flow chamber 116. The air flow in the air flow chamber 116 may be from the bottom to the top of the air flow chamber 116 as shown. The air flow may be driven by an air flow device 109 in the air flow chamber 116. The air flow device 109 may be one or more fans or any other suitable conventional apparatus.

One or more phase change material spray nozzles 103 spray fine droplets 110 of liquid-containing phase change material into the air flow chamber 116.

Figure 4:
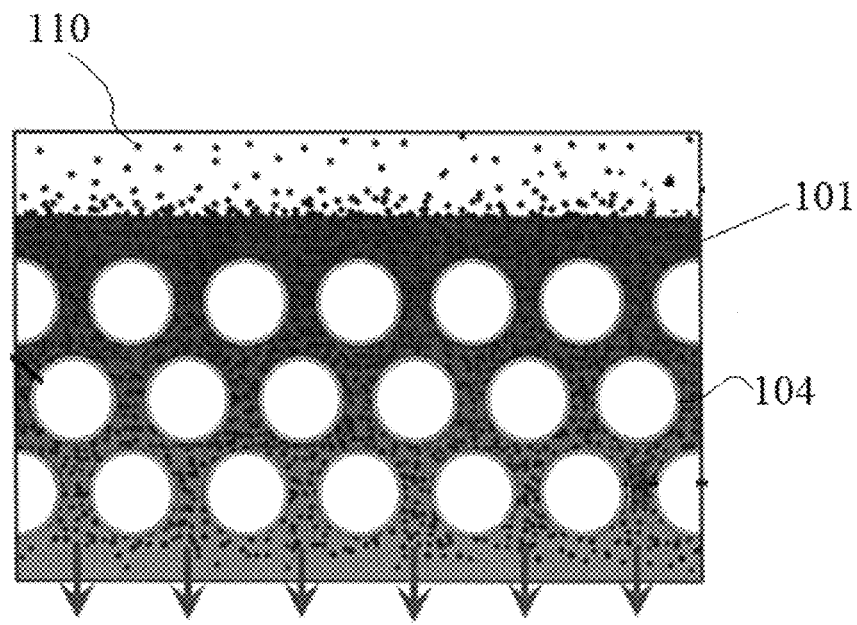
FIG. 4 is a schematic representation of a phase change material container with conduits and containing a phase change material.
Figure 5:
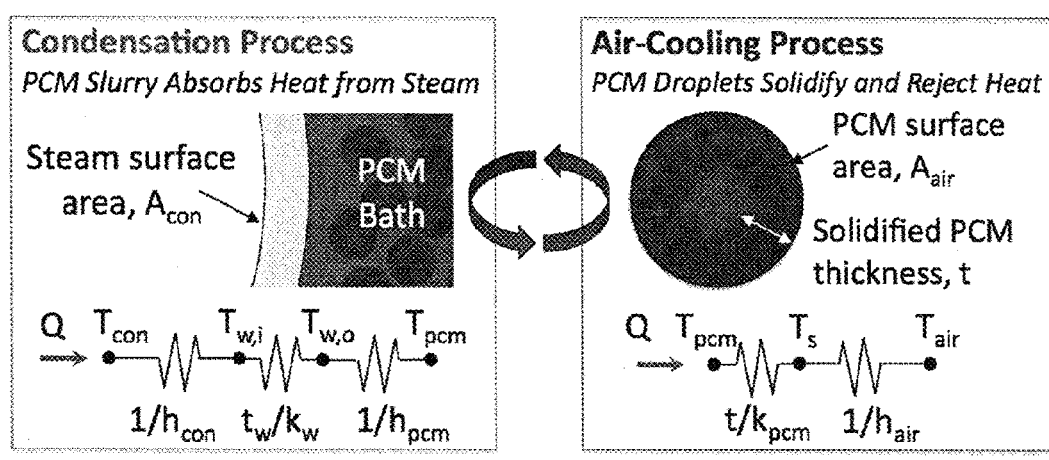
FIG. 5 depicts decoupled steam condensation and air cooling in accordance with the present invention.

Referring to FIGS. 3-5, a droplet 110 of liquid-containing phase change material is exposed to the air flow in the air flow chamber 116. The PCM droplets 110 provide a large surface area for transferring heat from the PCM droplets 110 to the air. As the heat is being transferred from the PCM droplets 110 to the air flow, the surface 121 of the PCM droplets 110 starts solidifying. As more heat is transferred out of the PCM droplets 110, the PCM droplets 110 may completely solidify. In some embodiments, PCM droplets 110 may contain only liquid PCM 115 though in other embodiments, PCM droplets 110 can potentially be a slurry of a portion of solid PCM 117 in liquid PCM 115.

The air flow in the air flow chamber 116 is controlled such that the air flow is not strong enough to carry the PCM droplets 110 out of the air flow chamber 116 through the air outlet 108. At the exit of the phase change material spray nozzle 103, the PCM droplets 110 have a relatively high velocity to propel the PCM droplets 110 through the air flow in the air flow chamber 116. In this embodiment, due to the direction of spraying, the PCM droplets 110 gradually lose velocity as they travel through the air flow chamber 116 and become solidified. The air flow rate should be adjusted so as not to entrain the PCM droplets 110 and carry them out through air outlet 108. The PCM droplets 110 eventually fall back to the surface of the PCM 111 in the phase change material container 101 which, in this embodiment, is located below the air flow chamber 116.

The diameter of the PCM droplets 110 is in millimeters. If the size of the droplets 110 is too small, a large amount of phase change material will be lost from the cooling system 100 since small PCM droplets 110 will be carried out of the air flow chamber 116 by the air flow through the air outlet 108. If the size of the PCM droplets 110 is too large, then there may not be sufficient surface area for transferring heat from the PCM droplets 110 to the air flow in the air flow chamber 116. As a result, the PCM droplets 110 may not be sufficiently solidified while passing through the air flow. Thus, if the diameter of the PCM droplets 110 is too large, the heat rejection from the PCM droplets 110 to the air may not be complete and this will result in a reduction in the efficiency of the cooling system 100.

In some embodiments, the mean diameter of the PCM droplets 110 is from about 0.5 mm to about 20 mm, or from about 1 mm to about 15 mm, or from about 1 mm to about 12 mm, or from about 2 mm to about 10 mm. The phase change material spray nozzles 103 are designed to generate phase change material droplets 110 with a narrow size distribution of, for example, ±2 mm, more preferably, ±1 mm and, most preferably, ±0.1 mm.

The phase change material spray nozzle 103 injects phase change material droplets 110 into the air flow chamber 116. While the phase change material droplets 110 travel through the air flow in the air flow chamber 116, they lose heat to the air flow and become solidified. The travel distance for the phase change material droplets 110 before they solidify depends on the size of phase change material droplets 110 and air flow rate in the air flow chamber 116. When the size of the phase change material droplets 110 increases, the phase change material droplets 110 take longer to solidify, thus requiring a larger and taller air flow chamber 116. Air flow rate increases will enhance heat transfer from the phase change material droplets 110 to the air flow, thus accelerating solidification of the phase change material droplets 110 and may reduce the size and height of the air flow chamber 16. Therefore, smaller phase change material droplets 110 and a higher air flow rate will accelerate solidification of the phase change material droplets 110 as they travel through the air flow, thus reducing the residence time required for the phase change material droplets 110 to solidify in the air flow chamber 116.

The one or more phase change material spray nozzles 103 spray phase change material droplets 110 into the air flow chamber 116. The phase change material spray nozzles 103 are designed to provide droplets 110 of a desired size and may atomize the liquid-containing phase change material 111 pumped from the lower portion of the phase change material container 101. The phase change material spray nozzles 103 spray the phase change material droplets 110 with a velocity such that the phase change material droplets 110 can travel through the air flow for sufficient time for transferring heat to the air flow and at least partially or completely solidifying the phase change material droplets 110, before the phase change material droplets 110 are returned to the phase change material container 101. In preferred embodiments, the phase change material droplets 110, as they lose velocity and heat, become solidified and fall back to the top surface of the phase change material 111 in the phase change material container 101.

In a preferred embodiment, droplets 110 of phase change material will be completely solidified upon passage through air chamber 116 prior to being returned to phase change material container 101. Thus, it is desirable to ensure that the residence time of the phase change material droplets 110 in the air chamber 116 is sufficient to completely solidify the liquid phase change material 115 in droplets 110. In the embodiment shown in FIG. 1, the phase change material droplets 110 are sprayed in a generally upward direction to maximize contact time with the air flow by requiring that the droplets 110 travel both upwardly in air chamber 116 and then back downwardly in air chamber 116 thereby providing additional time to solidify the phase change material 111. This embodiment allows use of a smaller air chamber 116 and thus a smaller cooling system 100. Alternatively, the droplets 110 can be sprayed from the top or another location of air chamber 116 but this may require enlargement of air chamber 116 to ensure sufficient residence time of droplets 110 in air chamber 116 for the desired complete solidification of liquid phase change material 115 to occur. Typically, the phase change material droplets 110 will be sprayed at an angle of 60-120° relative to the upper surface of the phase change material 111 in the phase change material container 101, or from 70-110° or from 80-100° or at about 90°.

It is also desirable to ensure that the solid phase change material 113 is returned to the phase change material container 101 in a manner which distributes as evenly as possible over the entire area of the phase change material 111 in phase change material container 101. This can be accomplished, for example, by directing the spraying of phase change material droplets 110 into air chamber 116 in a manner which ensures that the droplets 110 are relatively evenly distributed over the upper surface of the phase change material 111 in the phase change material container 101 when the solid phase change material 101 returns to the phase change material container 101. An exemplary spray pattern is shown in FIG. 1.

In some embodiments, the air flow rate in the air flow chamber 116 is from about 10,000 kg/s to about 130,000 kg/s, or from about 20,000 kg/s to about 120,000 kg/s, or from about 30,000 kg/s to about 100,000 kg/s, or from about 40,000 kg/s to about 90,000 kg/s, or from about 50,000 kg/s to about 80,000 kg/s. In some embodiments, the air velocity in the air flow chamber 116 may be from about 4 m/s to about 14 m/s, or from about 5 m/s to about 13 m/s, or from about 6 m/s to about 12 m/s, or from about 7 m/s to about 11 m/s, or from about 8 m/s to about 10 m/s.

The size of phase change material droplets 110 is correlated with the air flow speed in the air flow chamber 116. A faster air flow rate tends to carry phase change material droplets 110 out of the air flow chamber 116 more easily. The faster air flow rate also enhances heat transfer from the phase change material droplets 110 to the air flow. Thus, the size of phase change material droplets 110 should be increased when a faster air flow rate is used in the air flow chamber 116. Conversely, a slower air flow rate tends to not carry phase change material droplets 110 out of the air flow chamber 116. However, a slower air flow rate is less efficient for heat transfer from the phase change material droplets 110 to the air flow. Thus, a slower air flow rate requires smaller phase change material droplets 110 to provide more surface area for the heat transfer. A slower air flow rate also requires less power input into the air flow generation device 109. The air flow velocity must be sufficiently high to generate a sufficient heat transfer coefficient to remove the required amount of heat.

Figure 6:
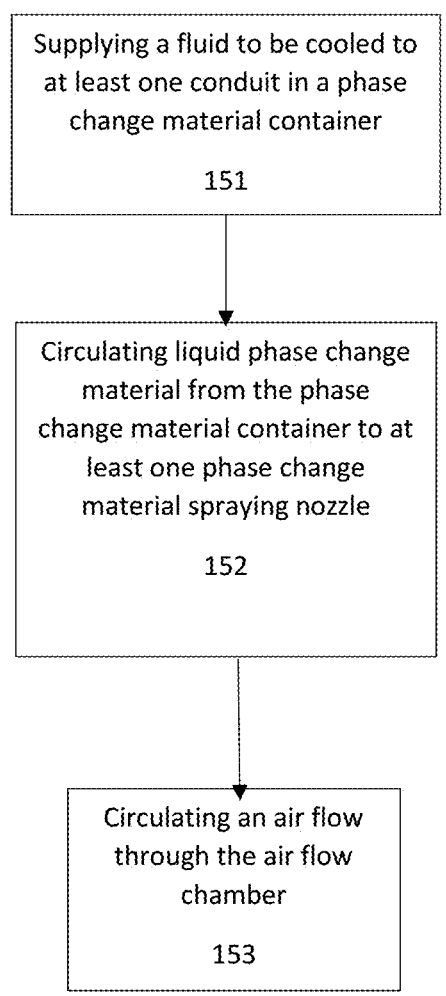
FIG. 6 is a flow chart of a method for operating a cooling system for cooling a fluid, according to one embodiment of the present invention.

In another aspect, the present invention provides a method as shown in FIG. 6 for operating a cooling system 100 for cooling a fluid. The method includes the steps of transferring heat from the fluid to a phase change material 111 to melt at least some solid phase change material 113 to provide liquid phase change material 115; spraying droplets 110 of liquid-containing phase change material 111 into circulating air for cooling and solidifying at least some of the liquid phase change material 115 to provide solid phase change material 113 by heating said air to provide heated air; recycling the solid phase change material 113 to the transferring step; and removing the heated air from the cooling system 100.

In the method, shown in FIG. 6, in supplying step 151, a fluid 113 to be cooled is supplied to at least one conduit 104 and passed through a phase change material container 101 for transferring heat from the fluid in the conduit 104 to the phase change material 111 in the phase change material container 101. In liquid circulating step 152, liquid-containing phase change material 111 is circulated from the phase change material container 101 to at least one phase change material spraying nozzle 103 for spraying liquid-containing phase change material droplets 110 into an air flow chamber 116. In air circulating step 153, air is circulated through the air flow chamber 116 for cooling the phase change material droplets 110, whereby the cooled phase change material droplets 110 become solidified and solid phase change material 113 is returned to the phase change material 111 located in the phase change material container 101.

The fluid to be cooled may be from any source of fluid that requires cooling such as fluid from a boiler that has been heated in a power plant. The fluid needs to be cooled and then cycled back to the boiler of the power plant. In supplying step 101, the fluid is supplied to the at least one conduit 104 passing through the phase change material container 101, where the at least one conduit 104 is bathed in a body of phase change material 111 which may be in the form of a slurry of solid phase change material 113 in liquid phase change material 115. The heat from the fluid in the conduit 104 is transferred through the wall of the conduit 104 to the phase change material 111 in the phase change material container 101. The absorption of heat from the conduit 104 causes a solid to liquid phase transition of the solid phase change material 113 to form liquid phase change material 115. After heat is transferred out of the fluid to the phase change material 111, the fluid is cooled and exits the conduit 104 through fluid outlet 106.

The phase change material container 101 has liquid phase change material 115 at its lower portion. A pump 102 pumps liquid-containing phase change material 111 through the outlet 112 from the phase change material container 101 to the at least one phase change material spray nozzle 103 through conduit 118.

The liquid-containing phase change material 111 in the conduit 118 may have a flow rate of from about 1,000 kg/s to about 5,500 kg/s, or from about 2,000 kg/s to about 4,500 kg/s, or from about 2,500 kg/s to about 4,000 kg/s, or from about 3,000 kg/s to about 4,000 kg/s, or from about 3,300 kg/s to about 3,800 kg/s.

The nozzle 103 sprays droplets 110 of the liquid-containing phase change material 111 of a desired size and/or size distribution, which travel through the air flow chamber 116 as shown, for example, in FIG. 1.

The air flow in the air flow chamber 116 is generated by an air flow device 109. The air flow device 109 may be one or more fans or any other suitable device for generating an air flow. The air flow device 109 controls the air flow rate in the air flow chamber 116. The air flow rate may be in the range of from about 10,000 kg/s to about 130,000 kg/s, or from about 20,000 kg/s to about 120,000 kg/s, or from about 30,000 kg/s to about 100,000 kg/s, or from about 40,000 kg/s to about 90,000 kg/s, or from about 50,000 kg/s to about 80,000 kg/s.

In some embodiments, the air velocity in the air flow chamber 116 may be from about 4 m/s to about 14 m/s, or from about 5 m/s to about 13 m/s, or from about 6 m/s to about 12 m/s, or from about 7 m/s to about 11 m/s, or from about 8 m/s to about 10 m/s.

The air flow is generated by drawing cool air into the air flow chamber 116 using, for example, a device such as an air flow device 109. The circulating air makes contact with the phase change material droplets 110, as shown in FIG. 4. Heat is transferred from the phase change material droplets 110 to the air flow, which warms up the air flow. After losing heat, the phase change material droplets 110 become solidified and fall back into the phase change material container 101.

EXAMPLE 1

A cooling tower based on the parameters listed in Table 2 was simulated. Table 2 summarizes the baseline spray-freezing air cool condenser (ACC) design parameters for the steam tube, the phase change material container, the phase change material sprayers, and the air flow, as well as the fans, pumps, and atomizers used to achieve the desired parameters. As highlighted in Table 2, the calculated air-side convective heat transfer coefficient $h_{air}$=165 W/m²K, which is about four times that of complex finned tubes in current ACCs. In addition, the total air-side heat transfer surface area provided by phase change material droplets 110 in-flight is around 440,000 m², equivalent to about twice the total surface area of current fin-tube ACCs with a larger footprint.

TABLE 2

Baseline air-cooled spray-freezing condenser design parameters.

| Parameter | Value | Parameter | Value |
|---|---|---|---|
| HT area for steam, $A_s$ | 700,000 m² | PCM settling time, $t_{set}$ | 80 s |
| Steam tube dia., d | 0.065 m | Total PCM drop HT area, $A_t$ | 440,000 m² |
| Steam tube spacing, δ | 0.02 m | # of PCM atomizers | 1000 |
| U-value for cond., $U_s$ | 100 W/m²K | PCM spray req. power, $P_{sp}$ | 200 kW |
| # of steam tube, N | 690,000 | Air flow rate, $\dot{m}_{air}$ | 70,000 kg/s |
| Steam tube length, H | 5 m | Air velocity, $V_{air}$ | 9.1 m/s |
| Steam flow rate per tube | 0.91 g/s | Air-side HTC, $h_{air}$ | 165 W/m²K |
| Steam pressure drop | <20 Pa | U-value for air cooling, $U_{air}$ | 116 W/m²K |
| PCM flow rate, $\dot{m}_{PCM}$ | 3,500 kg/s | Air Reynolds # | 3200 |
| PCM pumping power, $P_{PCM}$ | 343 kW | Air pressure drop, $\Delta p_{air}$ | 100 Pa |
| PCM liquid pipe dia, $d_l$ | 2 m | Fan power, $P_{fan}$ | 125 kW |
| PCM drop diameter, D | 0.005 m | Fan diameter, $d_{fan}$ | 10 m |
| PCM drop Biot # | <0.1 | Fan static pressure, $p_{fan}$ | 120 Pa |
| PCM drop gen. rate, N | 6.7 × 10⁷/s | # of fans | 64 |

Figure 7:
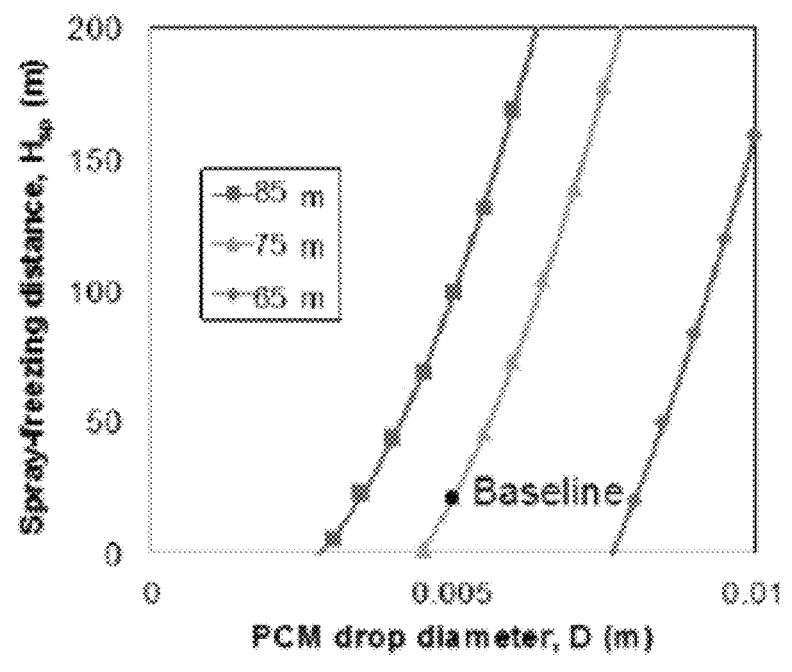

The computer simulated model based on the cooling tower described in Table 2 details the air-side heat transfer from the PCM droplets to the air flow in the air flow chamber. The spray-freezing distance for the PCM droplets in relation to the size (diameter) of the phase change material droplet is shown in FIG. 7. The spray-freezing distance is the distance that the PCM droplet must travel before the PCM droplet solidifies. It is observed that an increase of the size of the phase change material droplet will require a larger spray-freezing distance, thus a larger and/or taller air flow chamber. The computer simulated model shows three different air flow chambers with heights of 65 m, 75 m, and 85 m. Note that, in contrast to finned-tube ACCs, the steam condensation and air-cooling are decoupled in the present invention, which allows the steam tubes be optimized independently of the air flow chamber to reduce cost and pressure drop.

Encapsulated Phase Change Materials

The spray-freezing of PCMs is able to help in the cooling of power plants, but there is a chance of contamination caused by drift when spray-freezing PCMs. Encapsulating the PCMs can help avoid spray nozzle clogging due to dust and other debris.

A solution employing encapsulated PCMs (EPCMs) may involve using a modular based EPCM lattice. This will provide high $h_{air}$, which involves no blow away or the use of a nozzle. The EPCM lattices can be fabricated using low cost fabrication methods, such as via the use of molds and 3D-printing. Different modules may have different $T_{pcm}$ for the EPCMs. It is further possible to employ holographic polymerized photonic crystals as the EPCM encapsulant.

Figure 8:
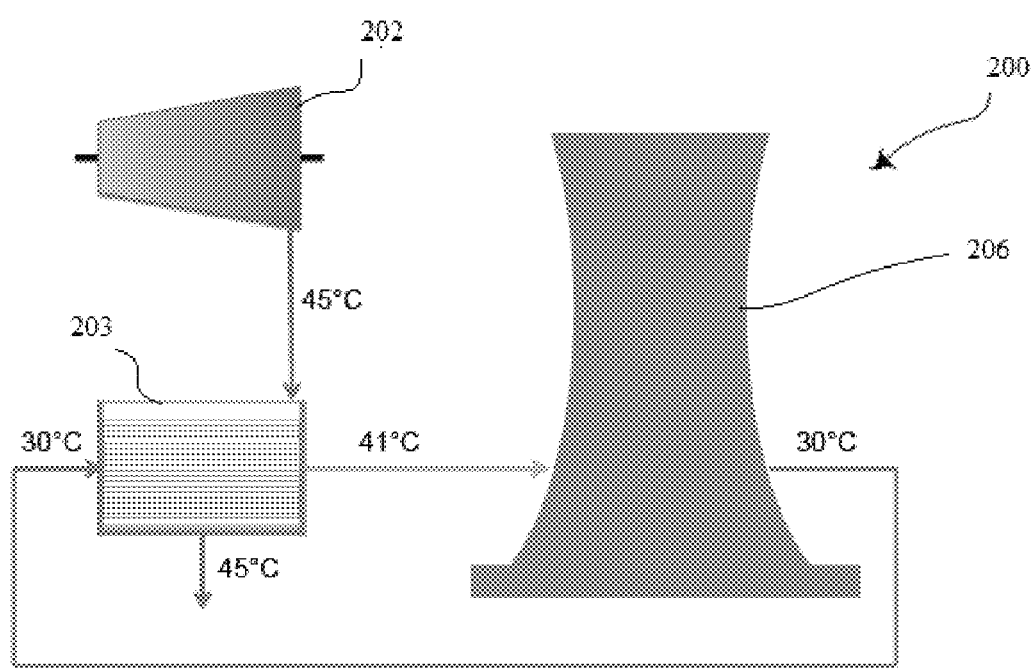
FIG. 8 is a schematic diagram of the power plant cooling system in accordance with an embodiment of the invention.

A diagram of a power plant system 200 that may employ the air-cooled EPCM heat exchanger is shown in FIG. 8. The power plant system 200 includes a turbine 202 and a condenser 203. Hot water is sent from the condenser 203 to the cooling tower 206. Within the cooling tower 206 is the heat exchanger 210 that will provide cooling. Heat exchanger 201 is shown in more detail in FIG. 9.

Figure 9:
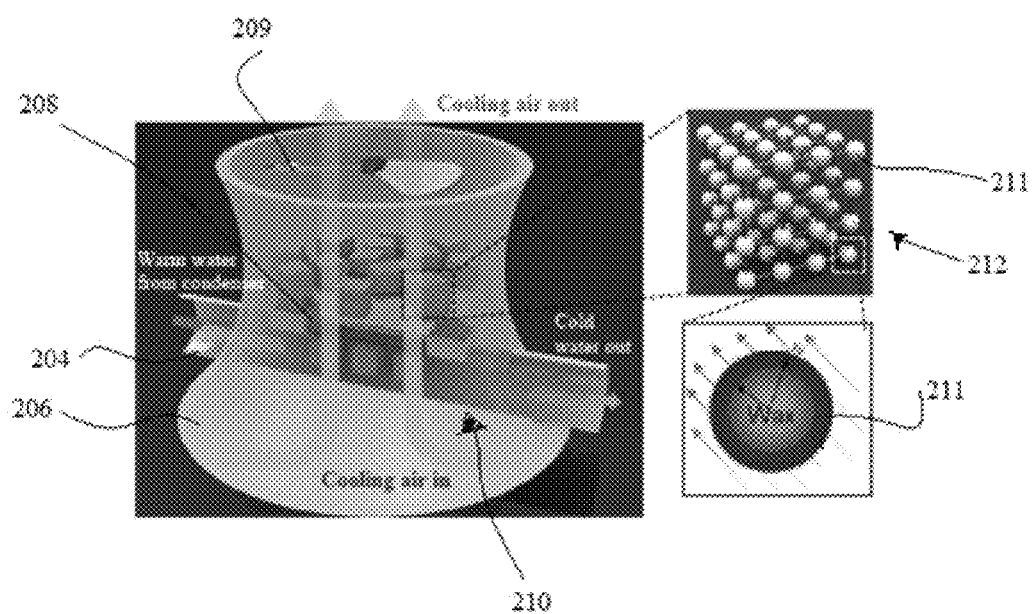
FIG. 9 is a schematic diagram of the cooling system using an encapsulated phase change material.
Figure 10:
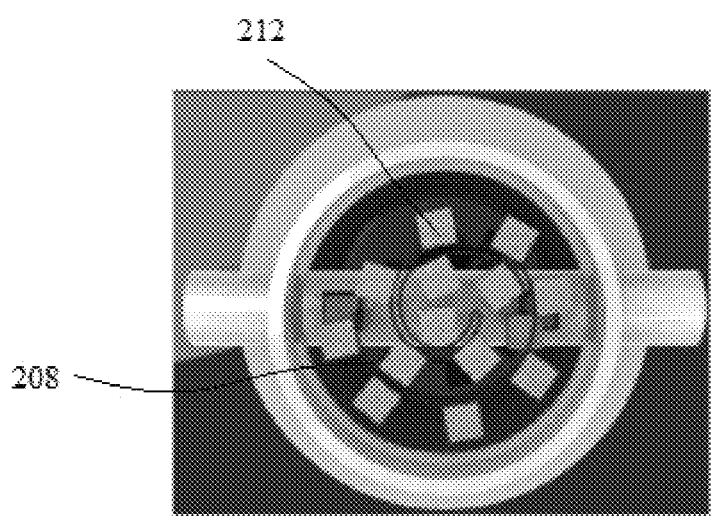
FIG. 10 is a top down view of the cooling system shown in FIG. 9.
Figure 11:
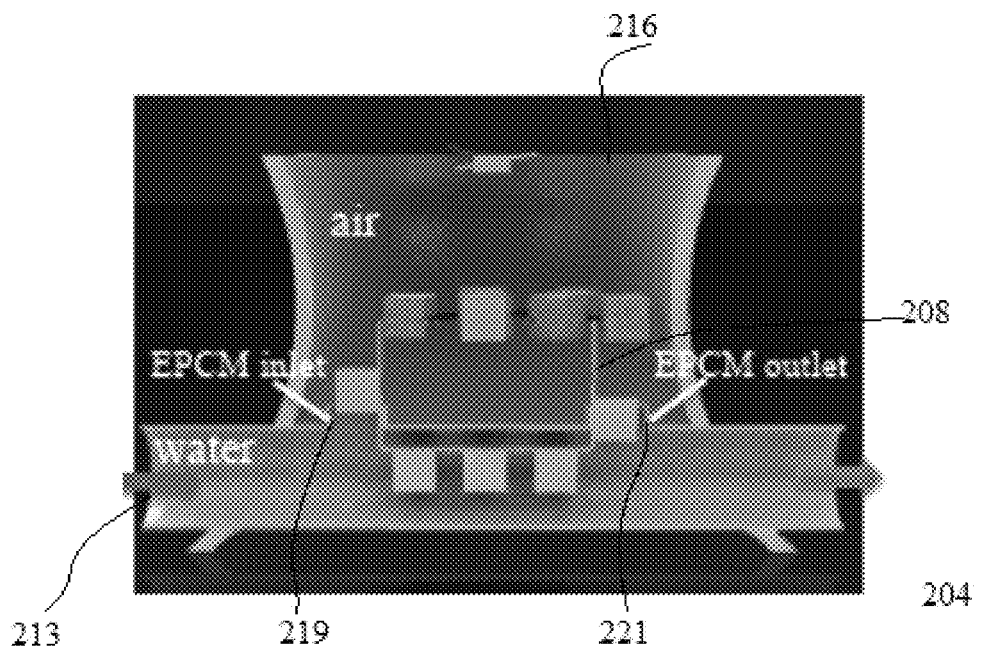
FIG. 11 is an interior diagram of a portion of the cooling system shown in FIG. 9 using the encapsulated phase change material.

FIGS. 9-11 illustrate the air-cooled EPCM heat exchanger 210. FIG. 9 shows the interior of the cooling tower 206 and the details of the heat exchanger 210. The heat exchanger 210 comprises EPCM modules 212. The EPCM modules 212 are comprised of lattices of individual EPCM particles 211. As shown in FIG. 9 the EPCM lattices may form a cube shaped matrix, however it is contemplated other shapes may be formed from EPCM particles 211, such as, for example, belts, wires, drag bodies (e.g. parachute shaped), etc. The heat exchanger 210 is designed to move EPCM modules 212 throughout the cooling tower 206.

As shown in FIGS. 9-11 the EPCM modules 212 are interconnected via a cable 208, or other mechanism for moving the EPCM modules 212 throughout the cooling fluid 213. The cooling fluid 213 may be, for example, water, from the condenser 203. The cooling fluid 213 enters the cooling tower 206 via the conduit 204. The EPCM modules 212 are moved through the conduit 204 using the cable 208 and eventually EPCM modules 212 move through the EPCM inlet 219 into the air flow chamber 216. The EPCM modules 212 are circulated within the airflow chamber 216 using the cable 208 and ultimately leave the airflow chamber 216 via the EPCM outlet 221. The EPCM inlet 219 and the EPCM outlet 221 are relatively small openings, which are about 1% larger than the size of the PCM structure thereby allowing for use of a flexible material e.g. a rubber or plastic film to form a seal around the EPCM inlet 219 and the EPCM outlet 221 that can be used to limit evaporative loss via the EPCM inlet 219 and EPCM outlet 221 to about 0.0% to 0.0042%.

EPCM modules 212 are uniformly distributed in the cooling tower and may be moved using the cable 208 at a suitable speed such as about 1 m/s. The ratio of EPCM modules 212 within the cooling fluid 213 to the EPCM modules 212 within the airflow chamber 216 is about 1:20. When using EPCM modules 212, different EPCM modules 212 having different $T_{pcm}$ can be easily interchanged based upon the different environmental factors, such as the current weather. The EPCM modules 212 also possess ultra-high surface area as a result of being made up of lattices of micron- and millimeter-sized EPCM particles 211. The EPCM modules 212 have greater than four times the $h_{air}$ when compared with ACCs. The EPCM modules 212 may also be fabricated to have a porosity of greater than 98% and low drag.

Additionally, the EPCM modules 212 is low in cost, able to be made via emulsion techniques, molding techniques, 3D printing, polymerization and other techniques known to those of ordinary skill in the art. Additionally, the EPCM modules 212 are easy to transport since they are light weight and modular based.

Figure 12:
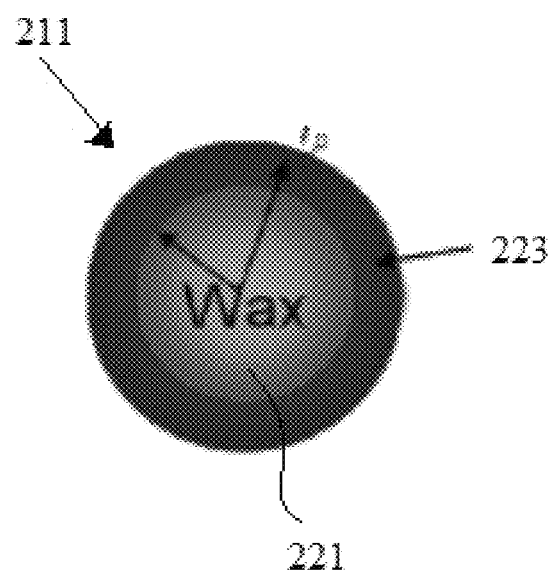
FIG. 12 is a diagram of an encapsulated phase change material.

The movement of the EPCM lattices 212 within the relatively warmer fluid 213 in the conduit 204, melts the encapsulated cores 221 of the EPCM particles 211. An exemplary EPCM particle 211 is shown in FIG. 12. The melting of the core 221 removes heat from the fluid 213. Circulation of the EPCM lattices 212 through the air flow chamber 216 re-solidifies the core 221 for the next pass through the fluid 213.

Figure 15:
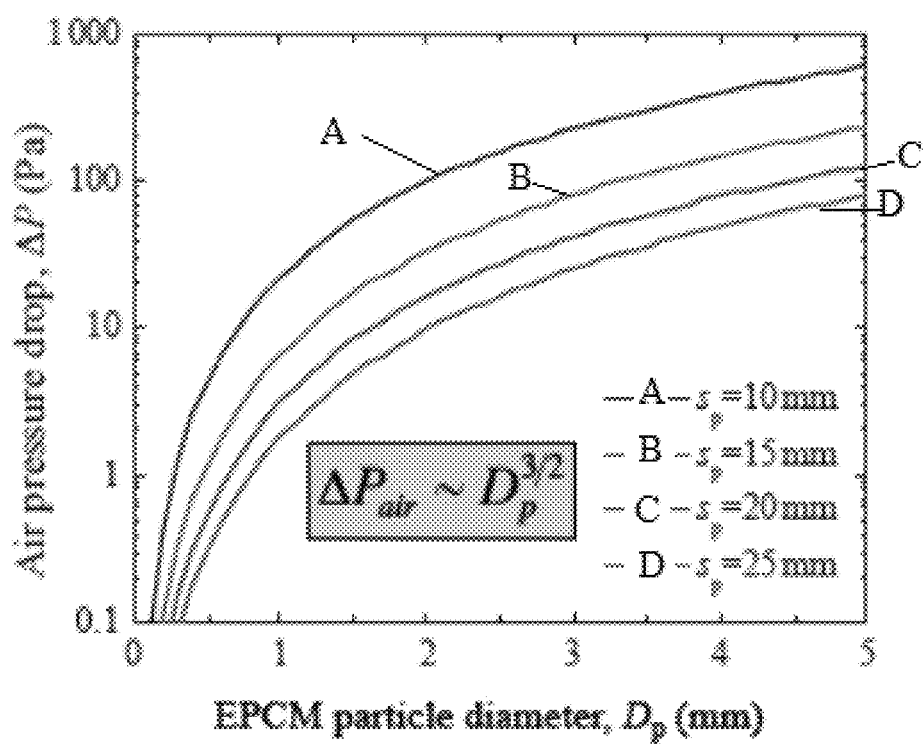
FIG. 15 is a graph showing air pressure drop versus encapsulated particle diameter for varying center-to-center particle spacings.
Figure 16:
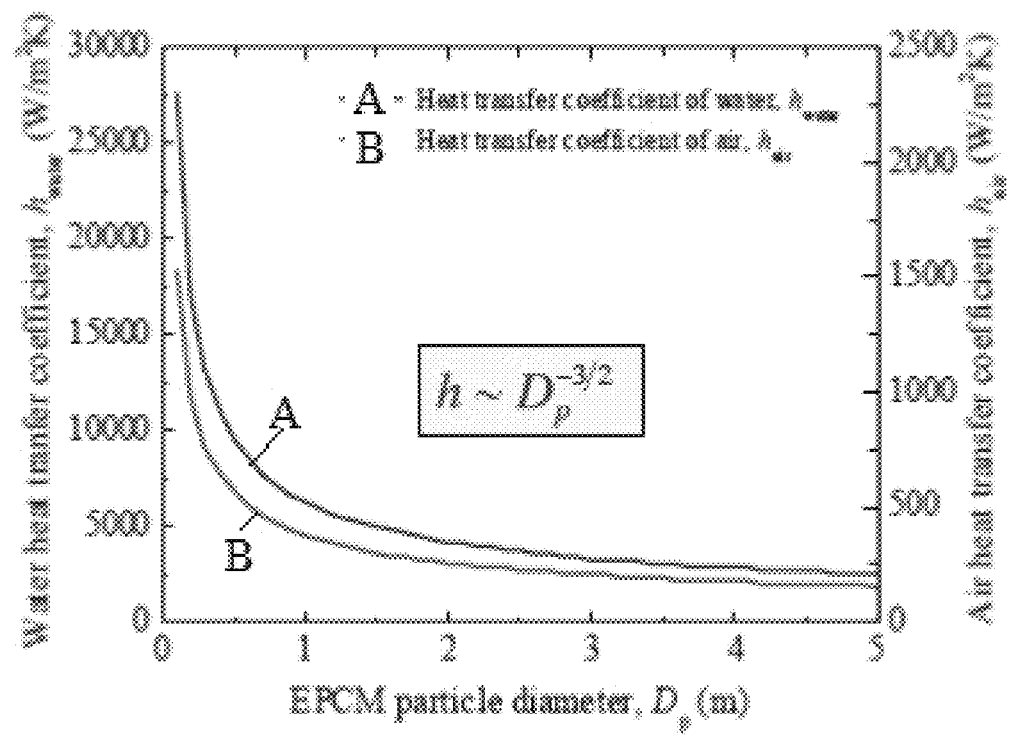
FIG. 16 is a graph of the encapsulated phase change material particle diameter as it relates to the water heat transfer coefficient and the air heat transfer coefficient.

FIGS. 15 and 16 are graphs that show the effects of different diameters of the EPCM particles 211. FIG. 15 shows the air-side pressure drop versus the diameter of the EPCM particles 211. Air-side pressure drop is calculated using the correlations of pressure drop over tube banks. Air-side pressure drop is calculated using the equation:

$$\Delta P_{air} = n_l f \chi \frac{\rho_{air} U_{air}^2}{2}$$

Where f is the friction factor, X is the correction factor and $n_1$ is the number of tube layers. FIG. 16 is a graph showing the effect of the EPCM particle diameter on the water and air heat transfer coefficients. From FIGS. 15-16, it can be seed that a smaller diameter EPCM particle 211 reduces the fan power required (FIG. 15) and enhances heat transfer. However, these factors must be balanced with the concern that the encapsulating material needs to be thick enough to be sufficiently strong and this may increase cost of the EPCM. The diameter of the rods within the EPCM lattice 212 may be 0.2 mm to 5 mm, more preferably 0.4 mm to 2.7 mm.

Table 3 shows some of the properties of EPCM particles obtained from Microtek.

TABLE 3

Properties of EPCM particles obtained from Microtek

| Model # | Latent heat (kJ/kg) | Melting point (° C.) | Core Material | Shell material | PCM (core) concentration (wt. %) |
|---|---|---|---|---|---|
| MPCM18 | 163-173 | 18 | Paraffin | Polymer | 85-90 |
| MPCM28 | 180-195 | 28 | Paraffin | Polymer | 85-90 |
| MPCM37 | 190-200 | 37 | Paraffin | Polymer | 85-90 |

Using the EPCM lattice 221 to provide cooling of the fluid 213 eliminates emission issues that may occur when compared with sprayed PCMs. Encapsulated EPCM particles 211 are fixed thus eliminating emissions. Further, the EPCM is not pumped, but circulated by, for example, a conveyor, thereby reducing the power necessary to overcome frictional forces. Also, unlike the spray, there is no need for nozzles, fins or tubes in order for the EPCM particles 211 to be circulated. Instead, equipment is used to move the EPCM lattice 221 through the cooling tower 206. Suitable equipment may include a conveyor belt, rollers, etc. EPCM particles 211 have a controllable size and no coalescence during melting. However, they have a lower latent heat of about 150 kJ/kg, as compared to the pure PCM, which has a latent heat of about 220 kJ/kg. Suitable EPCMs are commercially available from companies such as BASF, Microtek, CIBA, etc.

Table 4 shows baseline EPCM heat exchanger design parameters.

TABLE 4

Baseline EPCM heat exchanger design Parameters

| Parameter | Value | Parameter | Value |
|---|---|---|---|
| Air Temperature | 20° C. | Inlet water temp. to condenser | 30° C. |
| EPCM melting point | 30° C. | Exit water temp. from condenser | 41° C. |
| EPCM particle center-center spacing | 15 mm | EPCM particle solidification time (in air) | 220 s |
| EPCM particle dia. | 5 mm | Water flow rate | 5583 kg/s |
| EPCM module dimension 1 m × 1 m × 1 m | 1 m × 1 m × 1 m | Water flow velocity | 0.05 m/s |
| EPCM module spacing | 0.3 m | Water Re # | 350 |
| Water-side EPCM module # | 2,500 | Water-side heat transfer coefficient | 2500 W/m²K |
| Air-side EPCM module # | 57,000 | Air flow rate | 70,000 kg/s |
| EPCM module velocity | 1 m/s | Air flow velocity | 10 m/s |
| Total EPCM particle # | 1.76 × 10¹⁰ | Air Re # | 3200 |
| Total EPCM particle HT area | 440,000 m² | Air-side heat transfer coefficient | 165 W/m²K |
| EPCM melting time (in water) | 10 s | | |

Figure 13:
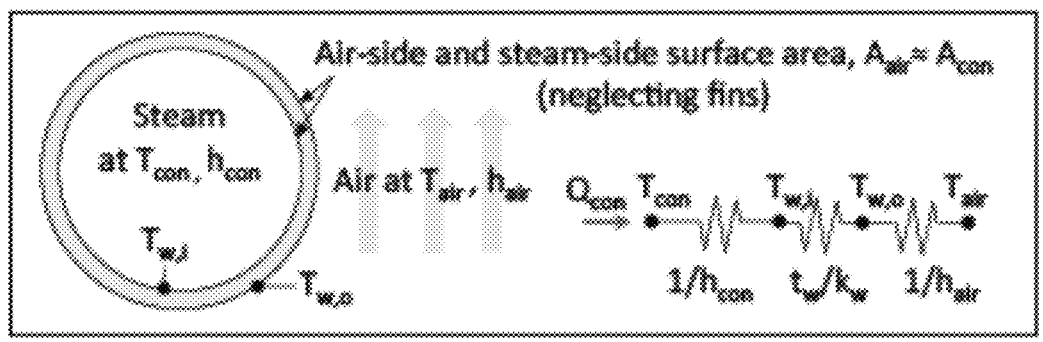
FIG. 13 is a diagram of a conventional air cooled steam tube.
Figure 14:
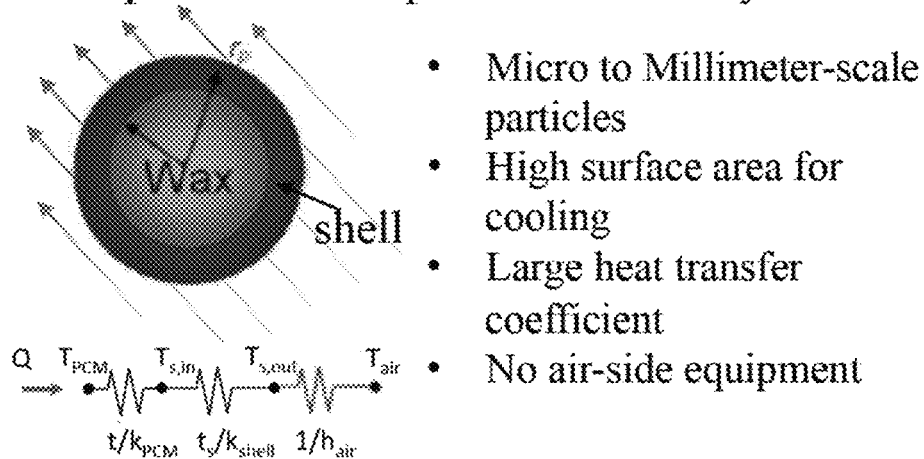
FIG. 14 is a diagram showing a cooled encapsulated phase change material particle.

FIGS. 13 and 14 show a system analysis of the air-side and steam side heat transfer of a traditional air cooled condenser (ACC) and an EPCM heat exchanger. FIG. 13 shows a diagram of the air-side and steam side surface area for a traditional ACC. FIG. 14 shows an EPCM particle 211 cooled by air. In a system with a 700 MW heat load and an air temperature of 20° C. the $h_{air}$ is about 45-50 W/m²-K for a traditional ACC, and the $h_{air}$ is about 165 W/m²-K for the EPCM heat exchanger using an EPCM particle 211 with a diameter of about 5 mm. The value $h_{air}$ is calculated as follows:

$$h_{air} = (2 + 0.6 Re_p^{1/2} Pr^{1/3}) \frac{k_{air}}{D}$$

The total EPCM particle heat transfer area is about $A_t$=440,000 m² and this parameter is preferably within the range of 400,000 m² to 750,000 m². This information demonstrates that the EPCM heat exchanger provides a significant improvement over the standard ACC.

Table 5 shows a system analysis of an EPCM heat exchanger, a PCM ACC and a traditional ACC with respect to PCM pumping and fan power. The analysis is performed using a 700 MW heat load, a $T_{air}$ of between 10-20° C. and 5 mm diameter EPCM particles 211.

TABLE 5

System analysis of PCM pumping and fan power

| | EPCM Heat Exchanger | PCM ACC | Traditional ACC |
|---|---|---|---|
| Total air flow rate, kg/s | 35,000-70,000 | 35,000-70,000 | 32,400-45,000 |
| Air Reynolds # | 1,600-3,200 | 1,600-3,200 | 4000-6000 |
| Air pressure drop, Pa | 100-200 | 100-200 | 75-100 |
| Air temperature rise, K | 10-20 | 10-20 | 17 |
| Fan static pressure, Pa | 100-220 | 100-220 | 75-125 |
| Total fan power, MW | 5.8-11.7 | 5.8-11.7 | 7.6 |
| Pumping power, MW | 0.22 | 0.343 | N/A |

TABLE 5-continued

System analysis of PCM pumping and fan power

| | EPCM Heat Exchanger | PCM ACC | Traditional ACC |
|---|---|---|---|
| Fan diameter, m | ~10 | ~10 | ~10 |
| # of fans | 100 | 100 | 100 |

The analysis shows that the pumping power is reduced the fan power is similar when compared to a PCM ACC. With an air pressure drop of $\Delta P \sim D_p^{3/2}$ a smaller particle size is desired.

Table 6 shows a system analysis of an EPCM heat exchanger and surface condenser, a PCM ACC and a traditional ACC based on size and cost. The table shows that there is a significant advantage of an EPCM heat exchanger and surface condenser over a PCM ACC and traditional ACC. The system employing the EPCM heat exchanger and surface condenser results in lower costs and requires no primary steam tubing. Further, the cooling tower height can be reduced to less than 20 meters. Also, there is a reduced particle emission problem as well as no nozzle clogging problem.

TABLE 6

System Analysis Size and Cost

| Parameter | EPCM heat exchanger + Surface Condenser | PCM ACC | Traditional ACC |
|---|---|---|---|
| Steam cond. temp (° C.) | 45 | 40 | 55-65 |
| # of units | 1 | 1 | 40-72 |
| Unit dimension (m$^2$) | 75 × 75 | 75 × 75 | 12 × 12 |
| Total footprint (m$^2$) | 5600 | 5600 | 6,000-11,000 |
| Equipment cost (MM$) | 15-20 | 30-45 | 60-100 |
| Total Power input (MW) | 11.7 | 12 | 7.5 |
| Production gain % (1%/3° C. cond. temp.) | 3.3-6.7% | 5-8.3% | |

More than One PCM

Figure 17:
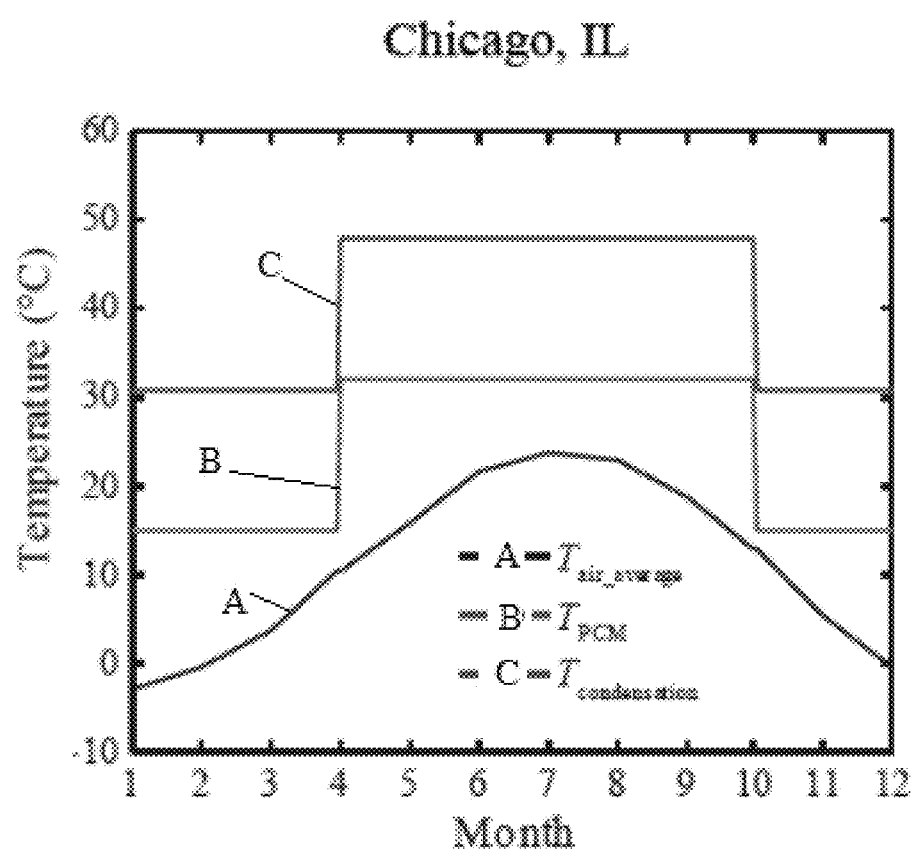
FIG. 17 is a graph showing the annual temperatures of the air, the temperature of condensation and the temperature of the phase change material in Chicago, Ill.
Figure 18:
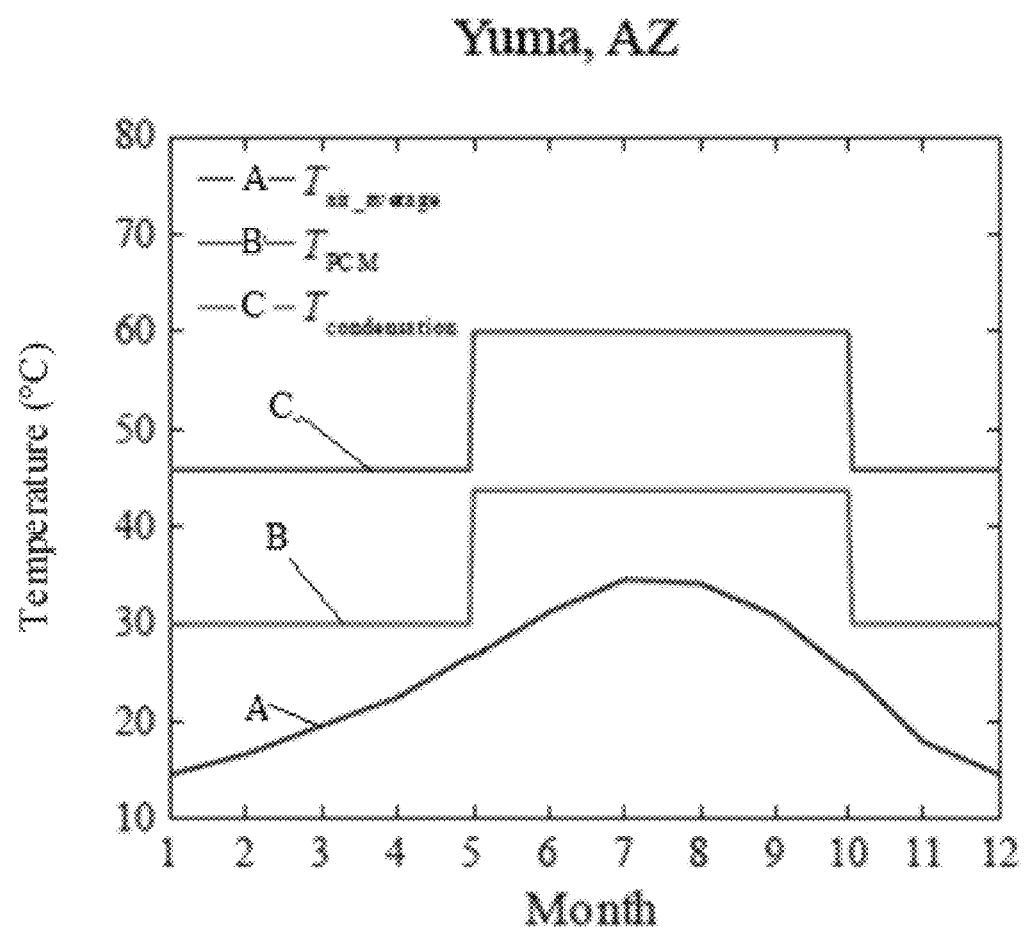
FIG. 18 is a graph showing the annual temperatures of the air, the temperature of condensation and the temperature of the phase change material in Yuma, Ariz.
Figure 19:
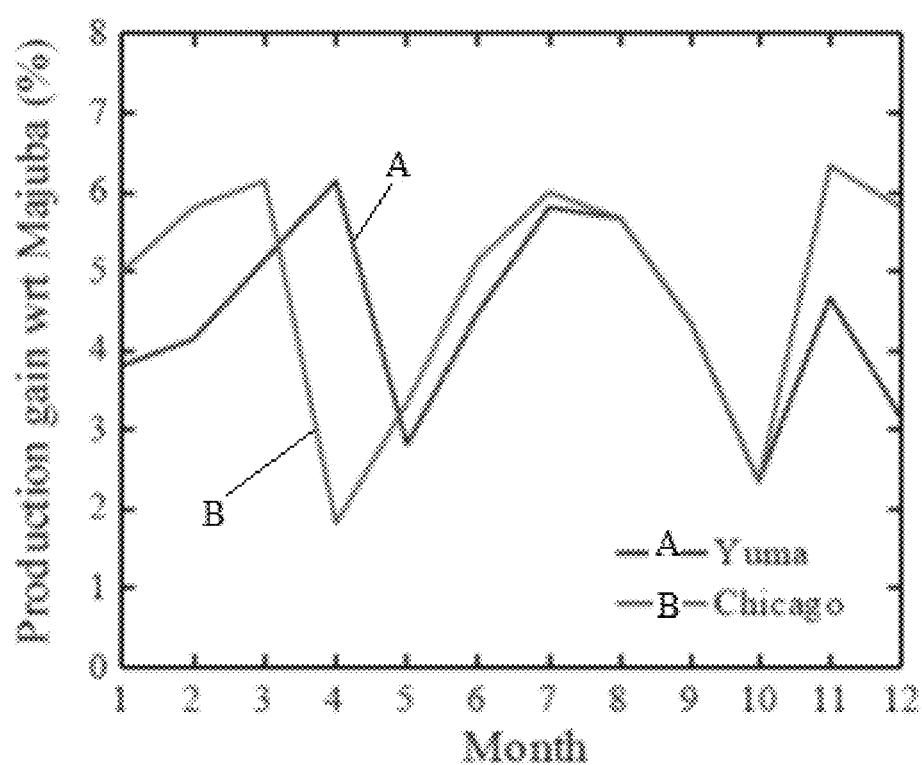
FIG. 19 shows the production gain with respect to Majuba percentage for Yuma, Ariz. and Chicago, Ill.

An alternative embodiment of the present invention contemplates using more than PCM for the cooling system. Different PCMs will typically have different phase change temperatures. FIGS. 17 and 18 show the year round operation when using more than one PCM. The year round operation graphs convey that when using two different PCM materials by using higher temperature PCM materials the system can be operated during the summer months, when the energy production need is greatest, without sacrificing much in performance. During the winter months the efficiency of the power plant can be increased by taking full advantage of the lower condenser temperature provided by the lower melting temperature PCM. In both cases the turbine exit temperature remains constant regardless of the PCM material used.

FIG. 18 is a graph showing the year round operation of dual PCMs in terms of production gain compared to direct ACC. The production gain is measured by considering the decrease in condenser temperature and the correlation that for every 3° C. drop in condenser temperature the production gain increases by 1%, see for example Table 6. The graph illustrates that there is 4.4% production gain for Yuma and 4.8% production gain for Chicago.

PCM Recirculating Mesh System

Figure 20:
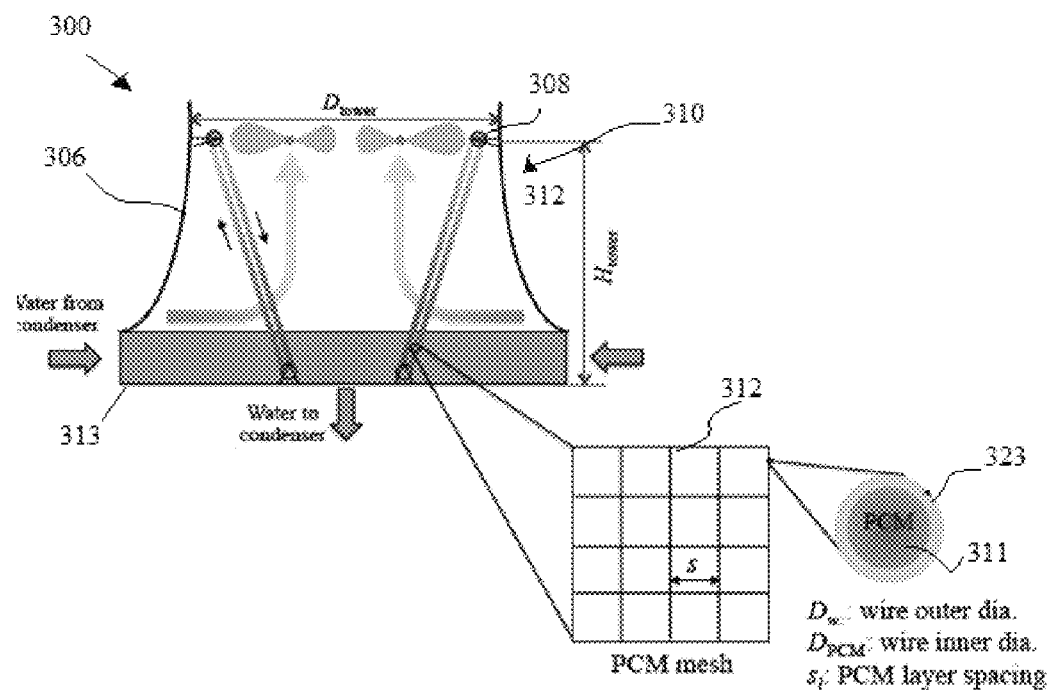
FIG. 20 shows a side view of a cooling system employing a moving mesh in accordance with an embodiment of the present invention.
Figure 21:
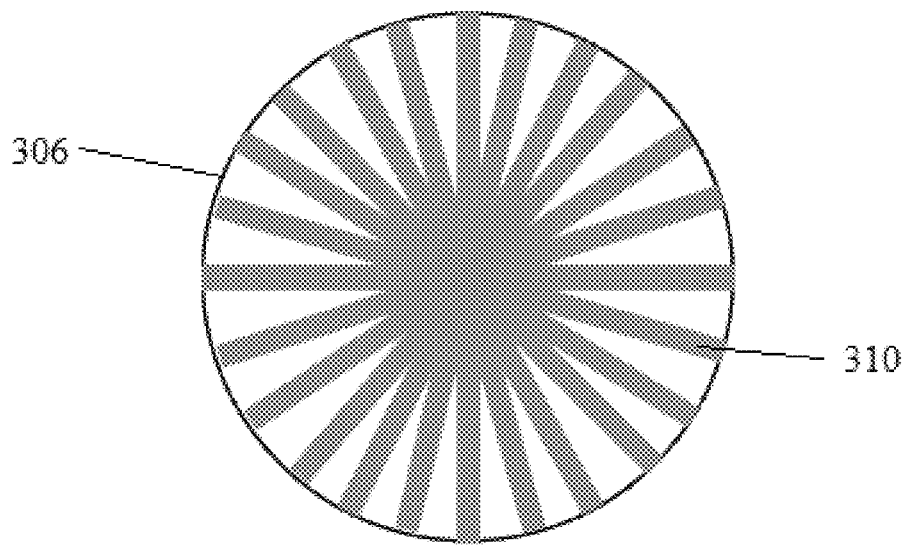
FIG. 21 is a top down view of the cooling system shown in FIG. 20.

Another embodiment of the present invention may employ a PCM recirculating mesh system 300. FIGS. 20 and 21 show a side view and a top down view of cooling tower 306 that employs a PCM recirculating mesh 310. The PCM recirculating mesh 310 is made of a mesh 312 comprised of PCM particles 311. Water exiting the condenser is cooled by melting phase change material embedded inside hollow metal/polymer thin wires that are interconnected to form a highly porous mesh 312. A plurality of meshes 312 may be layered to form a PCM recirculating mesh 310. In the embodiment shown, the PCM particles 311 are particles that are encapsulated with a metal encapsulating material 323. Additionally, the meshes 312 may be modular thereby allowing them to be substituted depending upon the environmental needs of area in which such meshes 312 are employed.

Figure 23:
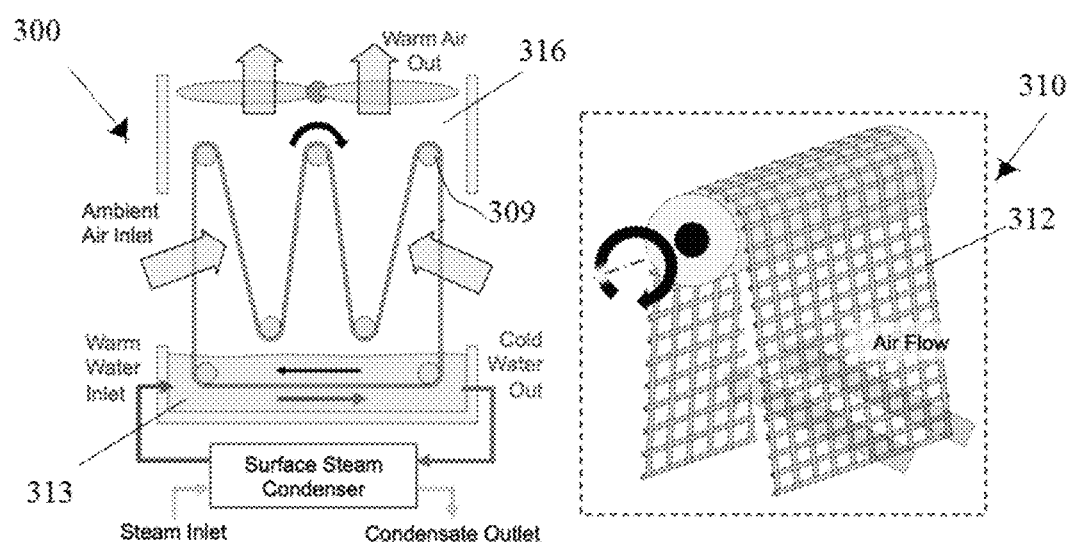
FIG. 23 shows a schematic view of a PCM recirculating mesh system and mesh, which employs conveyor rolls.
Figure 24:
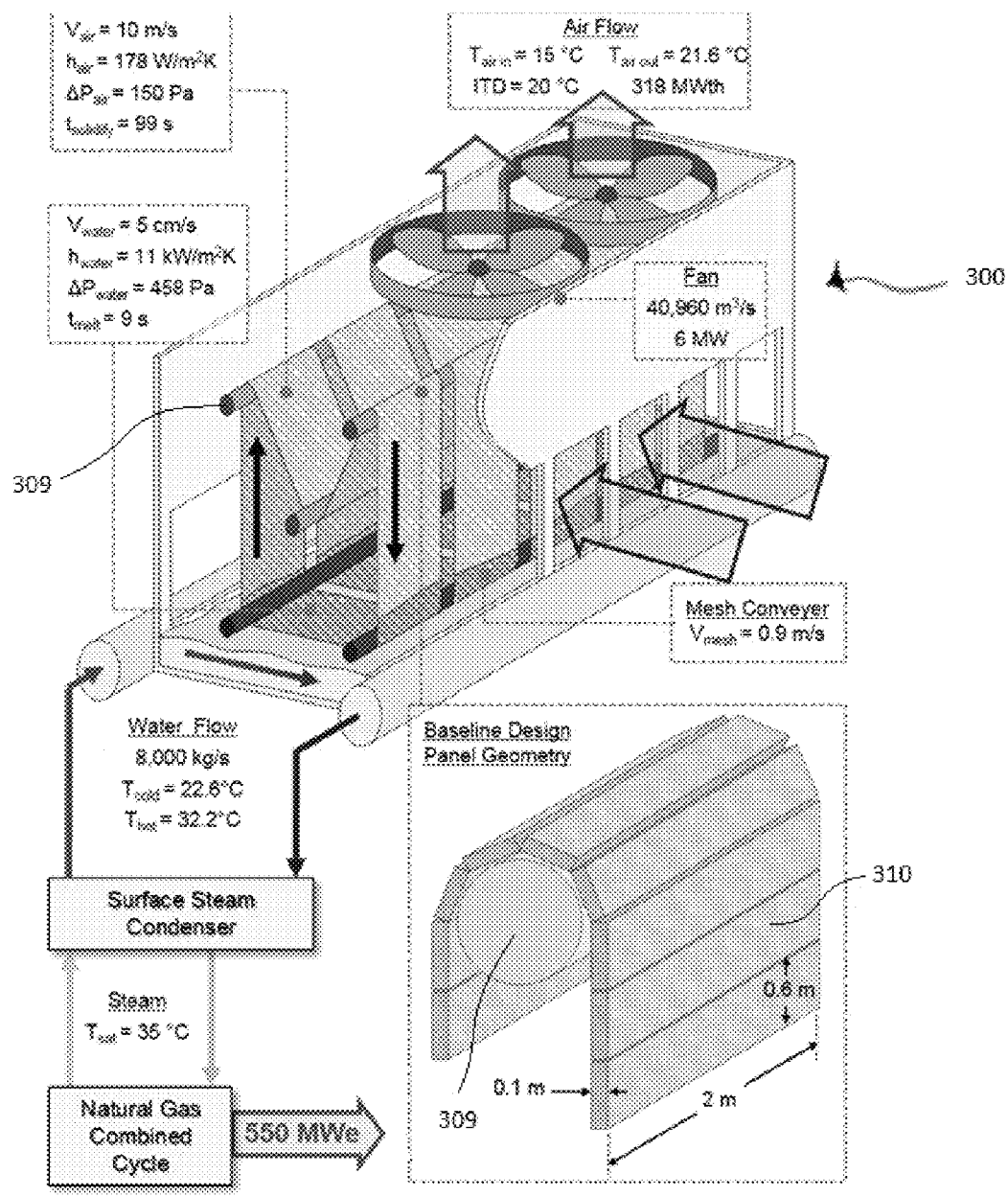
FIG. 24 shows another schematic view of a PCM recirculating mesh system employing conveyor rolls with an optional configuration that employs linked panels to create the mesh system.

Each mesh 312 may be moved between the fluid 313 and the airflow chamber 316 using a cable 308. FIGS. 23 and 24 also show a PCM recirculating mesh system 300 that employs conveyor rolls 309 to move the PCM recirculating mesh 310 through the airflow chamber 316 and fluid 313. The conveyor rolls 309 are one suitable mechanism for moving the PCM recirculating mesh 310. Other conventional transport systems may also be employed.

The mesh 312 cools the fluid 313 by absorbing heat from the fluid 313 thereby melting the PCM. The PCM in the mesh 312 loses heat and re-solidifies in the airflow chamber 316. The top down view of the PCM recirculating mesh system 300, shown in FIG. 21, shows that recirculating meshes are provided throughout the cooling tower 306 and radiate from the center of the cooling tower 306 to the top of the cooling tower.

Table 7 shows parameters of the PCM recirculating mesh 310 and the environment within the cooling tower 306.

TABLE 7

Values of parameters of cooling tower with PCM recirculating mesh

| Wire mesh diameter, $D_w$ | 2.7 mm | Air density, $\rho_{air}$ | 1.2 kg/s |
|---|---|---|---|
| Diameter of PCM contained in wire, $D_{PCM}$ | 1.9 mm | Air kinematic viscosity $v_{air}$ | 1.5 × 10−5 m$^2$/s |
| In-plane spacing S | 20 mm | Air velocity, $U_{air}$ | 10 m/s |
| Out-of-plane spacing, $S_1$ | 25 mm | Enthalpy of fusion, $h_{fs}$ | 200 kJ/kg |
| Porosity, ϵ | 0.977 | Cooling tower diameter, $D_{tower}$ | 80 m |
| Solidification Time, $T_{solidification}$ | 118 s | Cooling tower height, $H_{tower}$ | 30 m |

Table 8 shows an analysis of the PCM recirculating mesh 310.

TABLE 8

Baseline analysis for recirculating mesh

| Variable | Symbol | Value | Variable | Symbol | Value |
|---|---|---|---|---|---|
| Wire diameter | $D_w$ | 2.7 mm | Solidification time | $T_{soli}$ | 118 s |
| Wire thickness | $T_w$ | 0.4 mm | Melting time | $T_{melt}$ | 6 s |
| PCM | $D_{PCM}$ | 1.9 mm | Total PCM | $n_l$ | 150 |

TABLE 8-continued

Baseline analysis for recirculating mesh

| Variable | Symbol | Value | Variable | Symbol | Value |
|---|---|---|---|---|---|
| diameter | | | layer | | |
| Wire in plane spacing | S | 20 mm | Total mesh thickness | $H_{PCM}$ | 3.75 m |
| Wire out of plane spacing | $S_l$ | 25 mm | Waterside heat transfer coefficient | $h_{water}$ | 2960 W/m²K |
| Power load | $P_{total}$ | 700 MW | Air side heat transfer coefficient | $h_{air}$ | 178 W/m²K |
| Porosity | $\epsilon$ | 0.977 | Pressure drop in water side | $\Delta P_{water}$ | 111.74 Pa |
| Air side Reynolds # | $Re_{DW}$ | 1720 | Pressure drop in air side | $\Delta P_{air}$ | 165.5 Pa |
| Footprint | | 80 m × 80 m | | | |

Further analysis of the system provides the various parameters required for the PCM recirculating mesh 310. For example, using the values taken from Table 8 the PCM flow rate can be calculated as:

$$\dot{m}_{PCM} = \frac{P_{total}}{h_{fs}} = \frac{700 \text{ MW}}{200 \text{ kJ/kg}} = 3{,}500 \text{ kg/s}$$

Total PCM required in the air side can be calculated as:

$$m_{PCM\_total} = \dot{m}_{PCM} t_{solidification}$$
$$= 3{,}500 \text{ kg/s} \times 118 \text{ s}$$
$$= 4.13 \times 10^5 \text{ kg}$$

The PCM volume per recirculating mesh area is:

$$v_{PCM\_area} = \frac{2\pi D_{PCM}^2 S}{4}\left(\frac{1}{s}\right)^2 = 2.8 \times 10^5 \text{ mm}^3/\text{m}^2$$

PCM mass per a recirculating mesh area is:

$$m_{PCM\_area} = v_{PCM\_area} \rho_{PCM} = 0.217 \text{ kg/m}^2$$

The recirculating mesh thickness that is required can also derived from the various parameters provided in Table 8. The total recirculating mesh area is:

$$A_{total} = \frac{m_{PCM\_total}}{m_{PCM\_area}} = 1.9 \times 10^6 \text{ m}^2$$

The recirculating mesh area per layer is:

$$A_{layer} = \pi D_{tower} L_{screen}$$
$$= \pi \times 80 \text{ m} \times 50 \text{ m}$$
$$= 12566 \text{ m}^2$$

The number of recirculating mesh layers is:

$$n_t = \frac{A}{A_{layer}} = \frac{1.9 \times 10^6 \text{ m}^2}{12566 \text{ m}^2} = 150$$

Thus, the thickness of the PCM mesh is:

$$H_{PCM} = n_t s_l = 150 \times 25 \text{ mm} = 3.75 \text{ m}$$

Figure 22:
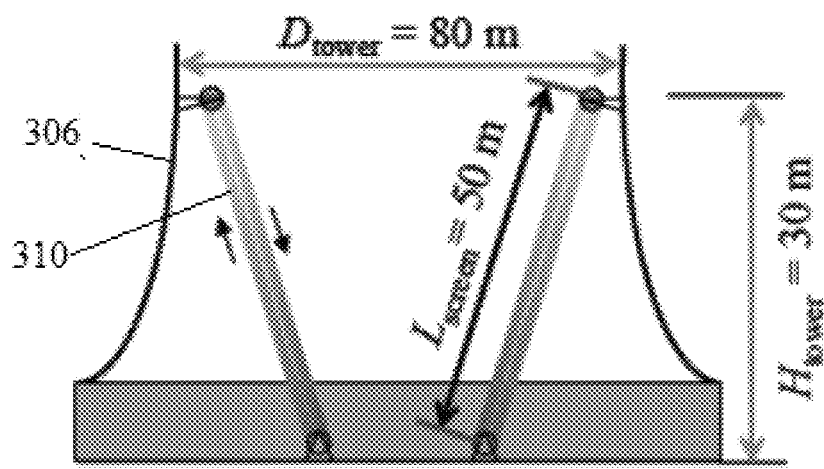
FIG. 22 shows a side view of a diagram illustrating an embodiment of the moving mesh of FIG. 20.
Figure 25:
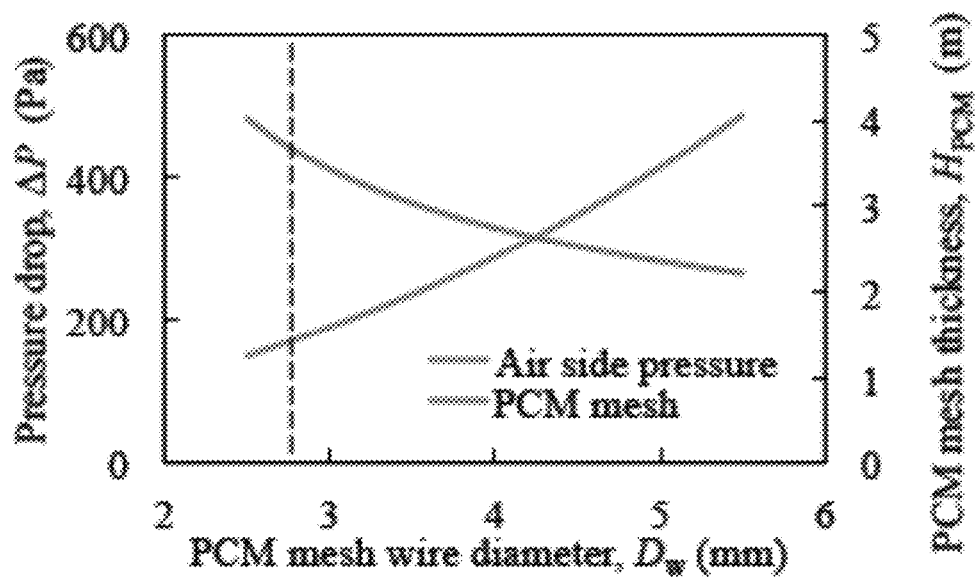
FIG. 25 is a graph showing the pressure drop, versus the phase change material mesh wire diameter and the phase change material mesh thickness.
Figure 26:
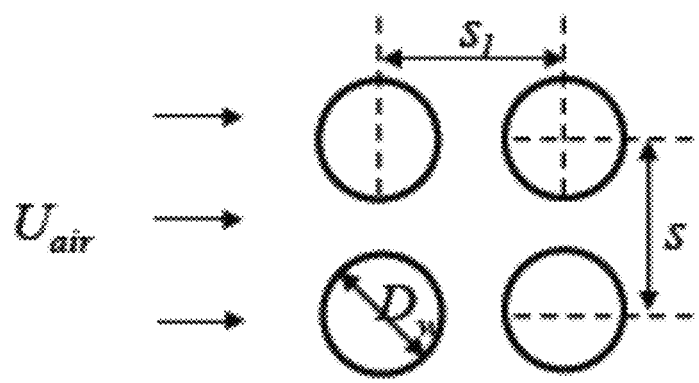
FIG. 26 is a diagram of the air flow across the conduit banks.

Reference is now made to FIGS. 25 and 26 to illustrate one method for calculating the air-side pressure drop of the PCM recirculating mesh system 300. The cooling tower 306 and the PCM recirculating mesh 310 and their respective dimensions are given in FIG. 22. The length of the recirculating mesh, $L_{RM}$=50 meters, the diameter of the cooling tower 306, $D_{tower}$=80 meters, and the height of the cooling tower, $H_{tower}$=30 meters, are used to calculate the air-side pressure drop using the following equation:

$$\frac{\Delta P_{air}}{H_{PCM}} = 64.5\left(\frac{1-\varepsilon}{\varepsilon}\right)^2 \frac{\rho_{air} v_{air} U_{air}}{D_w^2} + 1.455\left(\frac{1-\varepsilon}{\varepsilon}\frac{v_{air}}{U_{air}D_w}\right)^{0.103}\frac{1-\varepsilon}{\varepsilon}\frac{\rho_{air}U_{air}^2}{D_w}$$

where $U_{air}$ is the air velocity, $v_{air}$ is the kinematic viscosity of the air and $\rho_{air}$ is the air density.

The equation for determining volumetric porosity is:

$$\varepsilon = 1 - \frac{\pi D_w^2}{2ss_l}$$

The air-side pressure drop $\Delta P_{air}$ is 166 Pa in this calculation. FIG. 25 shows the relationships between the diameter and thickness of the mesh and the air-side pressure drop.

Figure 27:
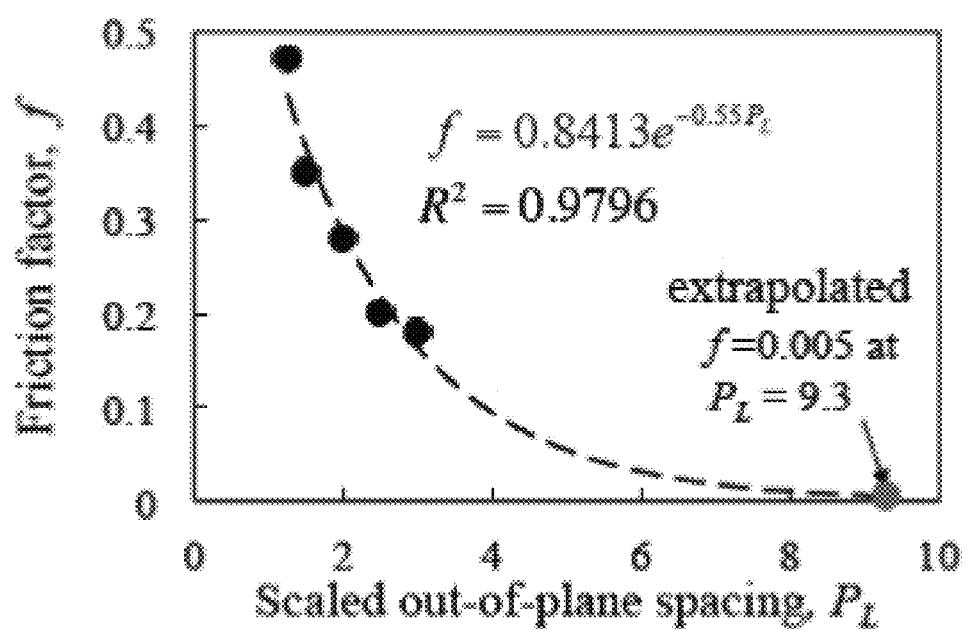
FIG. 27 is a graph of friction factor versus scaled out-of-plane spacing.

Reference is now made to FIGS. 26 and 27 in discussing another method of calculating the drop in air pressure across conduit banks such as are shown in FIG. 26. The equation used is:

$$\Delta P_{air} = n_l f \chi \frac{\rho_{air} U_{air}^2}{2}$$

In the equation above, f is the friction factor, x is the correction factor and $n_l$ is the number of conduit layers. The calculation is as follows:

$$P_L = \frac{s_l}{D_w} = \frac{25 \text{ mm}}{2.7 \text{ mm}} = 9.3$$

$$P_T = \frac{s}{D_w} = \frac{20 \text{ mm}}{2.7 \text{ mm}} = 7.4$$

$$\frac{P_T - 1}{P_L - 1} = 0.77 \; \chi = 1.3$$

and $$Re_D = \frac{U_{air} D_w}{v_{air}} = 1800$$

with an approximate value for f of 0.005. The approximate pressure drop across the mesh that results in a system with two perpendicular conduit banks, $\Delta P_{air}$ is 117 Pa.

The meshes 310 of the PCM recirculating mesh system 300 have a high heat capacity, a high heat transfer coefficient on both the air and water sides, a very large surface area, a low cross-flow pressure drop, and result in a low cost when compared to other systems. Compared to an existing fin-tubed air-cooled condenser (ACC), the PCM recirculating mesh system 300 reduces the dry-cooling initial temperature difference (ITD) required for operation of the system to 20° C., which makes the steam condensation temperature comparable to that of a wet cooling tower, without dissipating water to the environment. Furthermore, the low ITD dramatically improves the power production efficiency compared to current ACCs that have an ITD>35° C. Power production efficiency (eta) can be calculated by eta=1−TL/TH, where TL is the condenser temperature which is decreased relative to a typical ACC by fixing the PCM melt temperature. Also, the PCM recirculating mesh system 300 simultaneously increases both the heat transfer coefficient and heat transfer area, relative to those of complex finned tubes in current ACCs by significantly increasing the surface to area ratio. The PCM recirculating mesh system 300 has an air-side h value that is about four times the air-side h value of complex finned tubes in current ACCs. The PCM recirculating mesh system 300 also reduces the surface area and operational cost of primary steam by using indirect dry cooling to decouple steam condensation and heat rejection. Steam pathways can thus be optimized independently for reduced pressure drop and cost. Overall, the PCM recirculating mesh system 300 also reduces the capital cost and sub-freezing concerns relative to current ACC.

Compared to a spray-freezing cooling tower, the proposed PCM recirculating mesh system 300 has no particulate emissions because the encapsulated PCMs that are connected together into strong structures prevents contamination due drift loss. Furthermore, there is no need for additional air-side equipment when employing the present invention, since the absence of spray nozzles obviates potential nozzle clogging due to dust/debris. Also, the use of modular-based mesh 312 allows for different melting temperature PCMs to be substituted at different times to allow customization of the system to address different climatic conditions.

PCM Carousel

Figure 28:
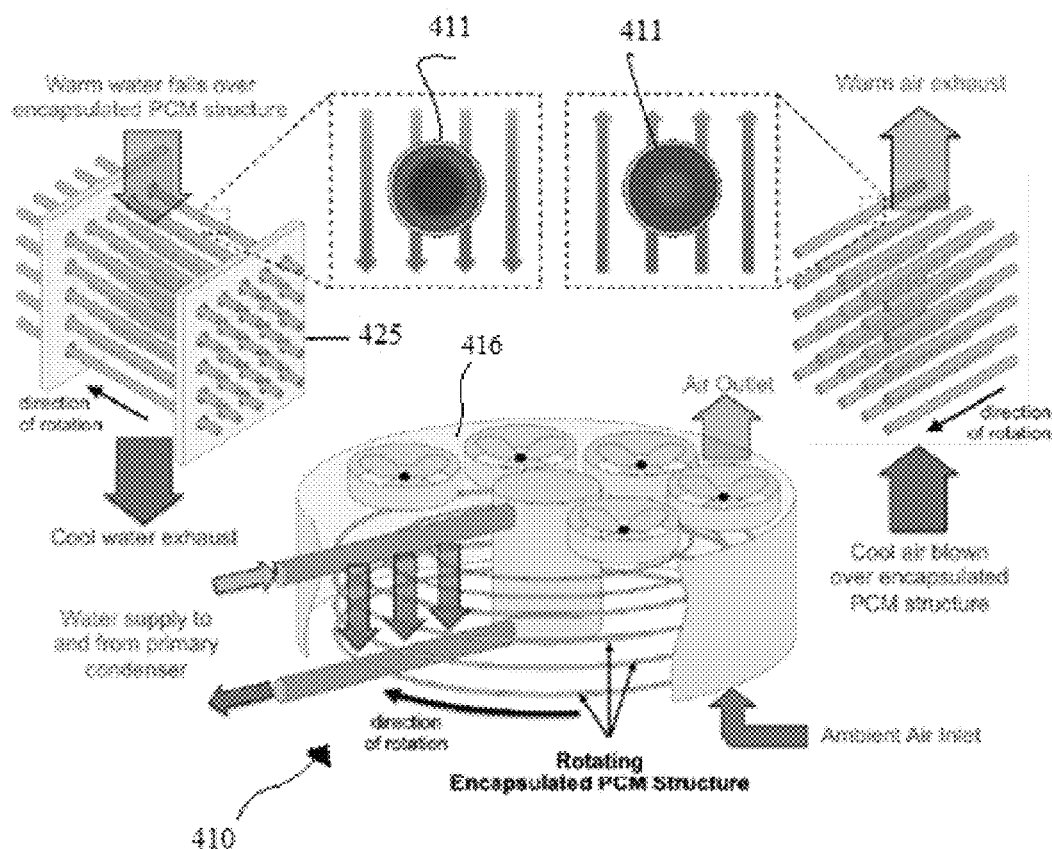
FIG. 28 is a schematic diagram of a carousel cooling system employing a rotating encapsulated phase change material structure in accordance with an embodiment of the present invention, the upper portion of FIG. 28 shows detail of diagram in the lower portion of FIG. 28.

FIG. 28 is a diagram of a PCM carousel 400. PCM carousel 400 is an alternative embodiment of a power plant cooling system. The upper portion of FIG. 28 shows detail of diagram in the lower portion of FIG. 28. In the PCM carousel 400 a porous EPCM structure 410 is rotated throughout the cooling tower. The EPCM structure 410 may be highly porous, having a porosity of, for example, 94% to 97%. As the EPCM structure 410 rotates, warm fluid, in this example water, cascades over EPCM structure 410. The EPCM particles 411 in the EPCM structure 410 absorb heat from the water causing the PCM material in EPCM particles 411 to melt. Cooled water is exhausted from the PCM carousel as shown. Separator walls 425 may be used to separate portions of the EPCM structure 410 to segregate water and air flows as well as minimizing drift of PCM material.

As the EPCM structure 410 rotates, ambient air is blown over the EPCM structure 410 in an airflow chamber 416. The EPCM particles 411 will then reject heat to the ambient air and freeze.

Table 9 is a table showing a baseline analysis for the PCM carousel 400 of FIG. 28.

TABLE 9

Analysis for PCM carrousel

| Variable | Symbol | Value | Variable | Symbol | Value |
|---|---|---|---|---|---|
| Wire diameter | $D_w$ | 2.7 mm | Solidification time | $T_{soli}$ | 118 s |
| Wire thickness | $T_w$ | 0.4 mm | Melting | $T_{melt}$ | 6 s |
| PCM diameter | $D_{PCM}$ | 1.9 mm | Total PCM layer | $N_l$ | 785 |
| Wire in-plane spacing | S | 30 mm | Water side heat transfer coefficient | $h_{water}$ | |
| Power load | $P_{total}$ | 700 MW | Air side heat transfer coefficient | $h_{air}$ | 178 W/m²K |
| Porosity | ε | 0.994 | Pressure drop in water side | $\Delta P_{water}$ | |
| Footprint | | 80 m × 80 m | Pressure drop in air side | $\Delta P_{air}$ | 167 Pa |

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A cooling system for cooling a fluid comprising: a heat exchanger comprising a recirculating mesh including a plurality of encapsulated phase change material meshes each including a plurality of encapsulated phase change material particles, and a cable driven by a device for moving the recirculating mesh between the fluid and an airflow chamber in a manner whereby some of said modules are positioned for heat exchange with said fluid and some of said modules are positioned for heat exchange with an air flow in said cooling system, wherein heat is transferred from the fluid to the encapsulated phase change material particles to melt at least some of the encapsulated phase change material particles to provide encapsulated liquid phase change material.

2. The cooling system of claim 1, comprising a plurality of recirculating meshes.

3. The cooling system of claim 2, wherein the plurality of recirculating meshes radiate from a central location within a cooling tower.

4. A cooling system for cooling a fluid comprising:
a heat exchanger including a plurality of encapsulated phase change material modules each including a plurality of encapsulated phase change material particles;

a rotating structure that rotates about a vertical axis for moving said modules in a manner whereby some of said modules are positioned for heat exchange with said fluid and some of said modules are positioned for heat exchange with an air flow in said cooling system, wherein heat is transferred from the fluid to the encapsulated phase change material particles to melt at least some of the encapsulated phase change material particles to provide encapsulated liquid phase change material.

\* \* \* \* \*